(12) United States Patent
Shafiee et al.

(10) Patent No.: US 7,062,465 B1
(45) Date of Patent: Jun. 13, 2006

(54) METHODS AND APPARATUS FOR PROVIDING AGENT CONTROLLED SYNCHRONIZED BROWSING AT A TERMINAL

(75) Inventors: Mohammad Reza Shafiee, Ridgefield, CT (US); Sankar Subramanian, Briarcliff Manor, NY (US)

(73) Assignee: Verizon Services Corp., Arlington, VA (US)

( * ) Notice: Subject to any disclaimer, the term of this patent is extended or adjusted under 35 U.S.C. 154(b) by 474 days.

(21) Appl. No.: 09/487,049

(22) Filed: Jan. 19, 2000

Related U.S. Application Data

(60) Provisional application No. 60/151,793, filed on Aug. 31, 1999.

(51) Int. Cl.
*G06F 17/60* (2006.01)
*H04K 1/00* (2006.01)
*H04L 9/00* (2006.01)

(52) U.S. Cl. .............................. 705/50; 705/1; 705/51; 705/64; 235/380; 713/1; 713/2; 713/201; 713/200

(58) Field of Classification Search ................ 705/50, 705/51, 78, 1, 64; 380/255; 709/217, 204, 709/202, 203; 713/154, 150, 162, 200–201; 379/90.01, 265; 235/380
See application file for complete search history.

(56) References Cited

U.S. PATENT DOCUMENTS

| | | | |
|---|---|---|---|
| 5,706,507 A * | 1/1998 | Schloss .................... 395/615 |
| 5,761,071 A * | 6/1998 | Bernstein et al. ...... 364/479.07 |
| 5,784,564 A * | 7/1998 | Camaisa et al. ........ 395/200.54 |
| 5,857,191 A * | 1/1999 | Blackwell, Jr. et al. ........ 707/10 |
| 5,867,494 A | 2/1999 | Krishnaswamy et al. ... 370/352 |
| 5,884,032 A * | 3/1999 | Bateman et al. ........ 395/200.34 |
| 5,889,958 A * | 3/1999 | Willens .................. 395/200.59 |
| 5,941,957 A | 8/1999 | Ingrassia et al. ............ 709/248 |
| 5,944,791 A * | 8/1999 | Scherpbier .................. 709/218 |
| 6,070,185 A * | 5/2000 | Anupam et al. ............. 709/204 |
| 6,130,933 A * | 10/2000 | Miloslavsky ............. 379/90.01 |
| 6,151,622 A * | 11/2000 | Fraenkel et al. ............ 709/205 |
| 6,163,536 A * | 12/2000 | Dunn et al. .................. 370/352 |
| 6,181,689 B1 * | 1/2001 | Choung et al. ............. 370/352 |
| 6,192,050 B1 * | 2/2001 | Stovall ....................... 370/389 |
| 6,212,192 B1 * | 4/2001 | Mirashrafi et al. .......... 370/401 |
| 6,233,618 B1 * | 5/2001 | Shannon ..................... 709/229 |
| 6,295,551 B1 * | 9/2001 | Roberts et al. ............. 709/205 |
| 6,360,250 B1 * | 3/2002 | Anupam et al. ............ 709/204 |
| 6,374,402 B1 * | 4/2002 | Schmeidler et al. .......... 717/11 |
| 6,493,447 B1 * | 12/2002 | Goss et al. ............. 379/265.09 |
| 2001/0039587 A1* | 11/2001 | Uhler et al. ................ 709/229 |
| 2001/0054064 A1* | 12/2001 | Kannan ...................... 709/203 |

(Continued)

FOREIGN PATENT DOCUMENTS

WO     WO 99/01826    *   1/1999

*Primary Examiner*—Kambiz Abdi
(74) *Attorney, Agent, or Firm*—Leonard C. Suchyta, Esq.; Joel Wall, Esq.; Straub & Pokotylo

(57) ABSTRACT

Establishing a (secure) synchronized (web) browsing session between a customer at a first terminal (such as a kiosk for example) and a live agent at an agent station. A session manager may be used to establish this session. The first terminal does not need to download an applet from the agent station. Typically, a call will have already been established between the customer and the live agent. The kiosk and/or the agent may control access to content based on locators to the content (e.g., URLs). The access control may be based on GO, NO GO lists and/or rules.

17 Claims, 19 Drawing Sheets

U.S. PATENT DOCUMENTS

2002/0042829 A1* 4/2002 Mizuhara et al. ........... 709/229
2002/0059144 A1* 5/2002 Meffert et al. ............... 705/51
2002/0087692 A1* 7/2002 Woods et al. ............... 709/225
2002/0107807 A1* 8/2002 Ketonen et al. .............. 705/51

* cited by examiner

| Field Name | Size (in bytes) | Description |
| --- | --- | --- |
| Login | 8 | Unique Login Name |
| Password | 8 | Password for this login |
| Port_Id | 16 | Unique system assigned Identifier. |
| Dir_Listing | 48 | Name for this user as it appears in a Directory |
| Profile_Flag | 4 | Profile Flag for stations |
| Category_Flag | 8 | Category Flag (capabilities / authorization) |
| Pug_Member | 8 | Private User Group Flag |
| Primary_Skill_Flag | 8 | Flag Identifying the agents Primary Skill |
| Secondary_Skill_Flag | 8 | Flag Identifying the agents Secondary Skill |
| Default_Skill_Flag | 8 | Flag Identifying the agents Default Skill |
| configNum | 4 | Configuration File Number (PUG) |
| BitmapName | 16 | Bitmap Name |

FIGURE 4

| Field Name | Size (in bytes) | Description |
| --- | --- | --- |
| Skill_Name | 48 | Name of this skill (unique) |
| Primary_Timeout | 8 | Primary Timeout in seconds (from hh.mm.ss) |
| Pri_VC Protocol | 4 | |
| Pri_VC_Address | 48 | |
| Secondary_Timeout | 8 | Secondary Timeout in seconds (from hh.mm.ss) |
| Sec_VC Protocol | 4 | |
| Sec_VC_Address | 48 | |
| Default_Timeout | 8 | Default Timeout in seconds (from hh.mm.ss) |
| Def_VC Protocol | 4 | |
| Def_VC_Address | 48 | |

FIGURE 5

| Field Name | Size (in bytes) | Description |
| --- | --- | --- |
| Category_Name | 48 | Name for Category (unique) |

FIGURE 6

| Field Name | Size (in bytes) | Description |
| --- | --- | --- |
| Pug_Name | 48 | Private_User_Group Name (unique) |

FIGURE 7

| Field Name | Type | Size (in bytes) | Description |
|---|---|---|---|
| Login | Char | 8 | The login name for this station |
| Password | Char | 8 | Associated Password field |
| Port_Id | Char | 16 | Stations Port_Id (unique) |
| Dir_listing | Char | 48 | The Directory Listing Field for the station |
| ProfileFlag | Long | 4 | Profile Flag |
| CategoryFlag | Long | 4 | CategoryFlag (Capabilities/authorization Flag) |
| PugFlag | Long | 4 | Privatue User Group Flag(PUG) |
| PriSkillFlag | Long | 4 | Primary Skill Flag (agent/ service only) |
| SecSkillFlag | Long | 4 | Secondary Skill Flag (agent / service only) |
| DefSkillFlag | Long | 4 | Default Skill Flag (agent / service only) |
| Status | Int | 4 | Station Status Field |
| Timeout_Ticks | Long | 4 | Time from last station request |
| VC_Protocol | Long | 4 | Video Conferencing Type Identifier |
| VC_Address | Char | 48 | Video Conferencing Address |
| Alt_Protocol | Long | 4 | Alternate Video Conferencing Type Identifier |
| Alt_Address | Char | 48 | Alternate Video Conferencing Address |
| IPAddress | Char | 48 | IP Address of a station |
| PortNum | Long | 4 | Port Number of a station |
| EncryptionType | Long | 4 | Encryption Type Employed |
| EncryptionKey | Char | 48 | Enryption Key |
| ConfigNum | Long | 4 | Default Configuration Number (PUG) |
| BitmapName | Char | 16 | Default Bitmap Name |

| Field Name | Type | Size (in bytes) | Description |
|---|---|---|---|
| StartTime | Time_t | 4 | Start time of the call |
| Party[0] | Int | 4 | Call Owner |
| Party[1] | Int | 4 | Party 1 |
| Party[2] | Int | 4 | Party 2 |
| Party[3] | Int | 4 | Party 3 |

| Field Name | Type | Size (in bytes) | Description |
|---|---|---|---|
| SkillName | Char | 48 | The name of the skill |
| skillFlag | Long | 4 | Skill Flag |
| PrimaryTimeOut | Long | 4 | Primary Timeout in sec |
| SecondaryTimeOut | Long | 4 | Secondary Timeout in sec |
| DefaultTimeOut | Long | 4 | Default Timeout in sec |

FIGURE 10

| Field Name | Size (in bytes) | Description |
| --- | --- | --- |
| Call_Q_First | 4 | Array Offset Index Pointer to first queue entry in Call Table |
| Call_Q_Last | 4 | Array Offset Index Pointer to last queue entry in Call Table |

NO GO LIST AND/OR RULES
*.com
http://*
*www.*
⋮
GO LIST AND/OR RULES
http://www.mellonbank.com
http://www.citibank.com
http://www.united_airlines.com
⋮
if *.mellonbank.com/*, then GO
if *.citibank.com/*, then GO
if *.united_airlines.com/*, then GO
⋮
FIGURE 22
128'
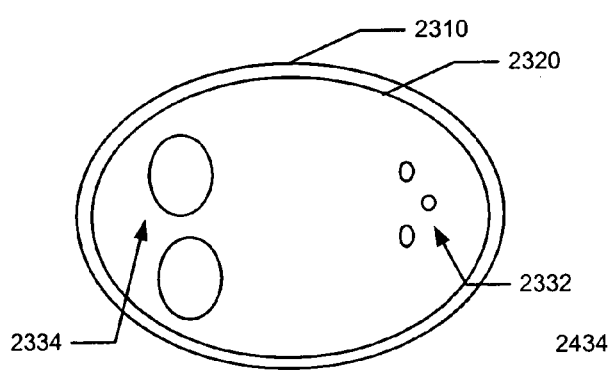
FIGURE 23
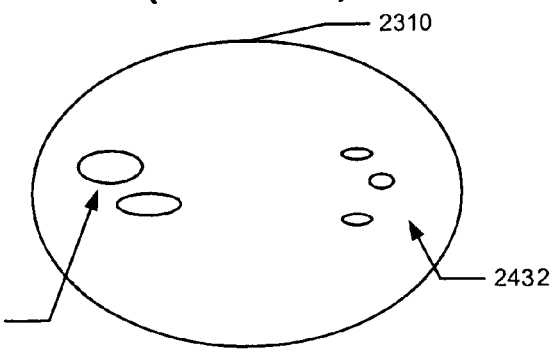
**FIGURE 24
(Prior Art)**

METHODS AND APPARATUS FOR PROVIDING AGENT CONTROLLED SYNCHRONIZED BROWSING AT A TERMINAL

§ 0. RELATED APPLICATIONS

Benefit is claimed, under 35 U.S.C. § 119(e)(1), to the filing date of provisional patent application Ser. No. 60/151,793, entitled "Interactive Multimedia System for Use with Kiosks and Internet Based Customers", filed on Aug. 31, 1999 and listing M. Reza Shafiee and Sankar Subramanian as inventors, for any inventions disclosed in the manner provided by 35 U.S.C. § 112, ¶ 1. This provisional patent application is expressly incorporated herein by reference.

§ 1. BACKGROUND OF THE INVENTION

§ 1.1 Field of the Invention

The present invention concerns methods and apparatus for providing agent controlled (e.g., secure) synchronized (e.g., web) browsing at a terminal. More specifically, the present invention concerns methods and apparatus for permitting a live agent to assist a customer at a terminal, such as a kiosk for example, by navigating through content, such as hypertext markup language (or "HTML") pages for example, which is rendered at both the customer terminal and the agent's station.

§ 1.2 Related Art

Below, methods for providing customer service, as well as perceived shortcomings of such methods, are introduced. Internet-based customer service and its perceived shortcomings are introduced in § 1.2.1 below. Then, a system in which customers can access live agents from kiosks is introduced in § 1.2.2. Finally, known synchronized web browsing techniques are introduced in § 1.2.3. The discussion of these systems in this section is not, and should not be interpreted as, an admission that such systems are prior art.

§ 1.2.1 Internet-Based Customer Service

The Internet has been successfully used to reduce the need for human customer service representatives. That is, in many instances, customers can use the Internet to answer questions that they would otherwise present to a human customer service representative (also referred to as a "live agent"). However, the present inventors believe that in may instances, customers still would like to confer (e.g., talk) with a live agent. The kiosk system discussed in § 1.2.2 below permits a customer at a kiosk to establish an audio, video, and/or text message conference or "call" with a live agent. The present invention uses the kiosk system of § 1.2.2 below to permit the live agent to navigate through content, such as HTML pages for example, which is rendered at both the customer terminal and the agent's station.

§ 1.2.2 Kiosk System

Provisional patent application Ser. No. 60/151,793, entitled "Interactive Multimedia System for Use with Kiosks and Internet Based Customers", and filed on Aug. 31, 1999, discloses a multimedia call center (or "MCC") in which live agents can assist customer end users at kiosk stations. It is expected that such kiosks will be located in areas open to the public, and preferably areas with high traffic such as airports, malls, grocery stores, train stations, bus terminals, etc. In such a system, a live agent can help a customer or potential customer complete a transaction. This system may be used to establish an audio, video, and/or text message conference or "call" with a live agent as is described in the provisional application and in § 4.2.1 below for the reader's convenience. The present invention may use this system to permit the live agent to navigate through content, such as HTML pages for example, which is rendered at both the customer terminal and the agent's station.

§ 1.2.3 Known Synchronized Web Browsing Techniques

Synchronized web browsing may be effected between a "guide" terminal (i.e., a terminal that navigates through content) and a "follower" terminal (i.e., a terminal upon which content retrieved (or requested) by the guide terminal may be rendered). Typically, the guide terminal will download a synchronized web browsing applet to the follower terminal. This applet is executed by a web browser, at the follower terminal, to establish a synchronized web browsing session.

Most web browsers, such as Explorer from Microsoft Corporation and Navigator from Netscape Corporation for example, have an optional setting in which applets, which may have been downloaded, are not automatically executed without the user's permission. This option permits the user to avoid malicious "virus" applets which may be used to steal personal or confidential information from the user's computer, destroy data at the user's computer, or perform some other type of malicious act using the user's computer. In the context of a kiosk system, security concerns led the present inventors to construct an exemplary browsing process in which no downloaded applets would be executed via the browser. Thus, a goal of the present invention is to establish and facilitate a synchronized (web) browsing session between an agent (guide) and a customer (follower) without downloading an applet for synchronized (web) browsing.

§ 2. SUMMARY OF THE INVENTION

The present invention discloses methods, apparatus and data structures which may be used to establish and facilitate a synchronized web browsing session between an agent (guide) and a customer (follower) without downloading an applet for synchronized (web) browsing. Communications between the agent and the customer related to synchronized browsing may be encrypted. The encryption may be based on information provided from a session manager when a call between the agent and the customer is established. The kiosk and/or agent station may control access to content based on locators to the content (e.g., URLs). The access control may be based on GO, NO GO lists and/or rules.

§ 3. BRIEF DESCRIPTION OF THE DRAWINGS

FIGS. 4 through 7 are exemplary database records which may be used to effect at least some aspects of the present invention.

FIGS. 8 through 10 are exemplary memory tables which may be used to effect at least some aspects of the present invention.

FIG. 16 is an exemplary data structure of a call queue.

FIG. 22 illustrates exemplary and simplified "NO GO" and "GO" lists and rules which may be used by the exemplary method of FIG. 21.

FIG. 23 is a Venn diagram which illustrates a possible operation of the access control method of FIG. 21.

FIG. 24 is a Venn diagram of known content filters.

§ 4. DETAILED DESCRIPTION

The present invention involves novel methods, apparatus and data structures for providing agent controlled synchronized browsing at a terminal. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter to the extent that they are patentable.

In the following, functions which may be performed by the present invention are introduced in § 4.1. Then, structures, processes, methods and data structures which may be used to effect those functions are described in § 4.2. Finally, an example of how an exemplary system of the present invention may operate is described in § 4.3.

§ 4.1 Functions which may be Performed

At a high level, the present invention may function to providing agent controlled synchronized browsing at a terminal. This may be done without downloading an applet for synchronized browsing to the terminal, or at least without downloading such an applet from a guide terminal. The present invention may also be used to establish a secure channel over which synchronized browsing commands and acknowledge messages may be communicated between an agent at an agent terminal and a customer at a terminal, such as a kiosk for example. The content to be browsed may include HTML pages for example. Access to content may be controlled at both the agent terminal and the kiosk.

§ 4.2 Structures, Processes, Methods and Data Structures

An overview of a system which may be used to effect various aspects of the present invention is provided in § 4.2.1 below. Then, exemplary embodiments of various components of the system are described in more detail in §§ 4.2.1.1 through 4.2.1.4 below. Finally, an example which illustrates an operation of the exemplary system is provided in § 4.3 below.

§ 4.2.1 System Overview

Figure 1:
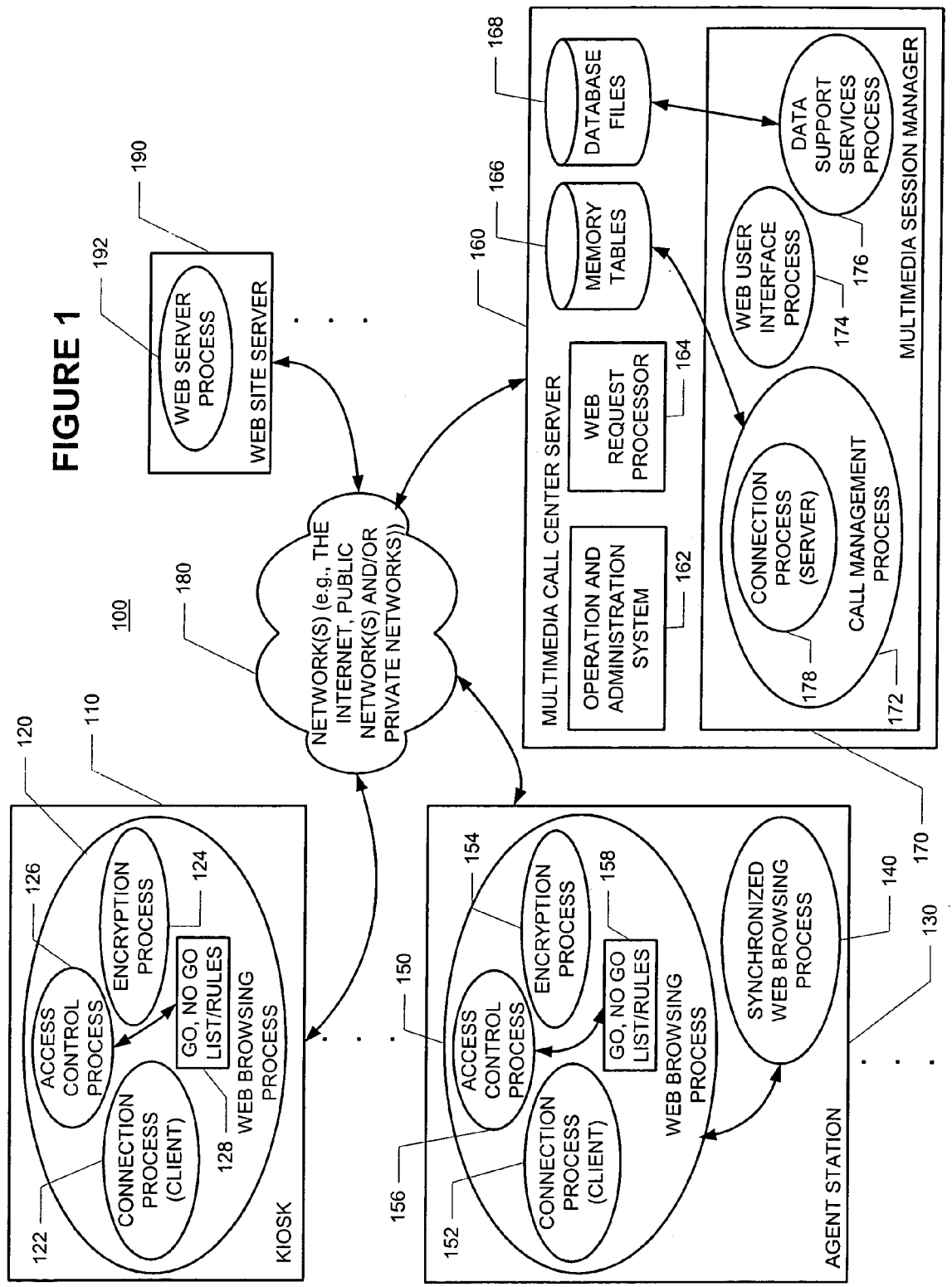
FIG. 1 is a high level block diagram of a system which may be used to effect at least some aspects of the present invention.

FIG. 1 is an exemplary system 100 which may be used to effect at least some of the functions introduced above. The system 100 may include one or more kiosks 110, one or more web site servers 190, one or more agent stations 130, and a multimedia call center server 160. Each of these components may communicate with one another via network(s) 180, such as the Internet, public network(s), and/or private network(s) for example. Each component of this exemplary system 100 is described in more detail below.

Figure 2:
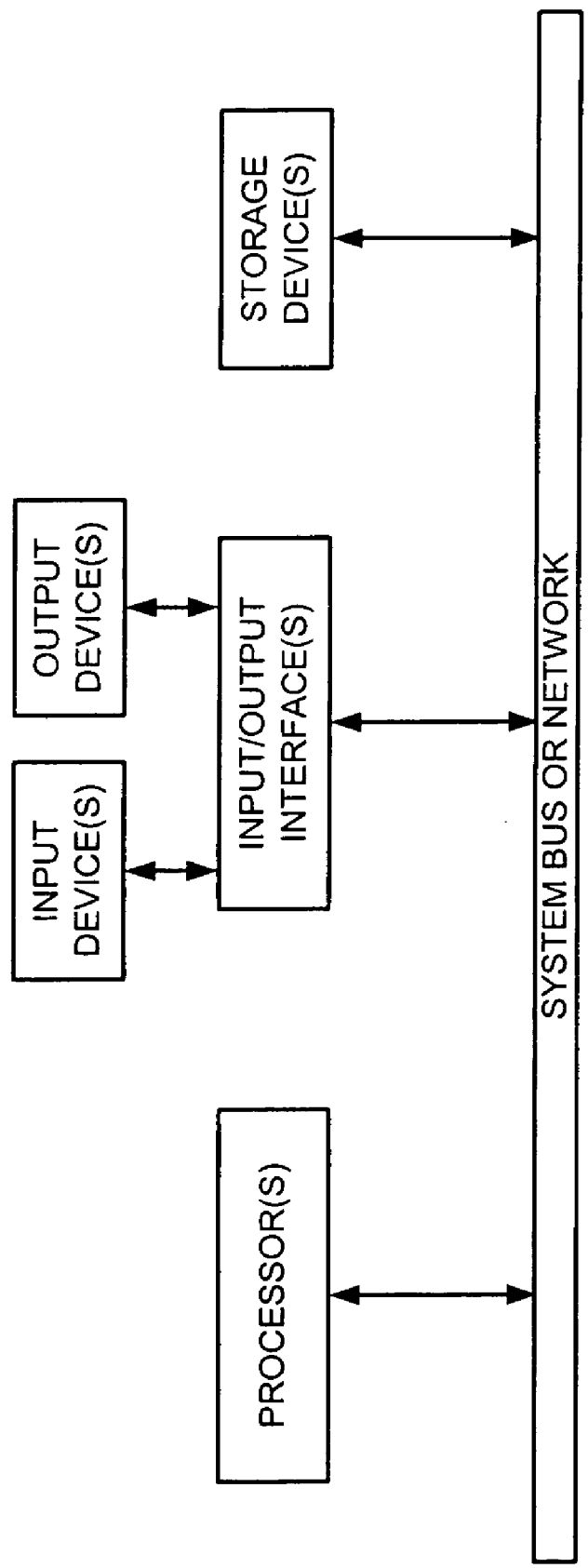
FIG. 2 is a high level block diagram of an architecture which may be used by various components of the system of FIG. 1.

A kiosk 110 may function to permit a customer to interact with a live agent. Such customer-live agent interactions may take place via video, audio and/or data (such as text messages for example) communications. The live agent can control the kiosk 110 to display information to the customer via a web browser and/or a display device. The kiosk 110 may also function to invoke the establishment of a connection between it and an agent station 130. Further, the kiosk 110 may function to encrypt (using a public key for example) communications sent from it. Furthermore, the kiosk 110 may function to control access to content, such as web pages for example. Referring to FIG. 2, these functions may be effected by a processor(s) 210, a storage device(s) 230 (such as RAM, ROM, magnetic, optical, and/or magneto-optic disks, and magnetic tape for example), input/output interfaces 220, an input device(s) 250 (such as a keyboard, a keypad, a pointing device, a microphone, a card reader, a signature capture device, a scanner, such as a flatbed scanner for example, a touch screen and/or a video camera for example), an output device(s) 260 (such as a video monitor, a printer, a check printer and/or a speaker(s) for example), and a system bus or network 240. The processor(s) 210, input/output interface(s) 220, and storage device(s) 230 may communicate with one another via the system bus or network 240. Thus, for example, the functions which may be performed by the customer terminal may be effected by a personal computer. An exemplary customer terminal (e.g., a kiosk 110) is described in more detail later, in § 4.2.1.2.

A web site server 190 may function to serve requested web pages or other content to customers at kiosks 110 and/or agents at agent stations 130. This and other functions, which may be performed by the web site server 190, may be effected by the devices discussed above with reference to FIG. 2.

The agent stations 130 may function to permit a live agent to assist a customer at a kiosk 110. Such assistance may take the form of audio, video, and/or data (e.g., text messages) communications, as well as synchronized (web) browsing in which the agent station 130 acts as a guide terminal and the kiosk 110 acts as a follower terminal. The agent station 130 may also function to invoke the establishment of a connection between it and another terminal, such as a kiosk 110 or another agent station 130. Further, the agent station 130 may function to encrypt (using a public key for example) communications sent from it. Furthermore, the agent station 130 may function to control access to content, such as web pages for example. An agent station 130 may further function to permit a live agent to control kiosk peripherals, access customer information from a database 168, update customer information, send and receive messages from other live agents, invoke the transfer of a customer to another live agent, and access call information. These functions, which may be performed by the agent station 130, may be effected by the devices discussed above with reference to FIG. 2. In an exemplary embodiment, agent stations 130 may include a web (e.g., HTML) browser which is similar to the web browser included in the kiosk stations. An exemplary agent station 130 is described in more detail later, in § 4.2.1.3.

The web browsers in both a kiosk 110 and an agent station 130 can be synchronized so that the same content is rendered at, or the same content can be requested by, both the kiosk 110 and the agent station 130 at about the same time. The live agent operating the agent station 130 can enable and/or disable the synchronized web browsing feature.

In view of the foregoing, a live agent can view scanned identification documents, interpret them, and manually enter name, address and other information obtained from the identification documents into one or more forms, e.g., credit applications, purchase forms, etc. Since communication between the kiosk 110 and the agent stations 130 may be provided over a secure, e.g., encrypted data channel, confidential information may be exchanged without fear of unauthorized interception. Thus, for example, completed application or purchase forms can be transmitted to a kiosk 110, a signature on the form captured, and payment received without security concerns. In addition, a live agent can control the printing of checks, money orders, etc. at the kiosk 110. Thus, for example, if a loan application is approved, the customer can be provided the money in the form of a check issued directly from the kiosk 110. Furthermore, a live agent can fill out service and/or purchase forms based on, e.g., customer information obtained via scanned identification documents, and control the kiosk 110 to print the completed form. A customer's signature on a completed form can be captured using the kiosk's signature capture device and the completed form with signature can be printed at the kiosk 110 as well as the agent station 130. The flat bed scanner can be used to acquire images of driver's licenses, credit cards and other forms of identification.

A multimedia call center server 160 may include an operation and administration system 162, a multimedia session manager 170, and storage devices 166, 168. The operation and administration system 162 may function to (i) monitor the system 100, (ii) check the status of any entity of the system 100, (iii) add or change agent stations 130, kiosks 110 and services, (iv) generate reports of agents, system usage, etc., and (v) distribute system files to various terminals. The multimedia session manager 170 may function to (i) distribute requests for agents (also referred to simply as "calls"), (ii) set up conferences, (iii) set up (e.g., secure) synchronized web browsing sessions between agents at agent stations 130 and customers at kiosks 110, (iv) manage communications channels, (v) download and upload files, (vi) manage skill groups and private user groups, (vii) log in and update kiosks 110 or other system terminals, (viii) control the login of live agents, (ix) distribute calls to skill groups and agents, (x) create private user groups (or "PUGs"), and (xi) create call usage records. The multimedia session manager 170 may include a call management process 172 (also referred to as a "multimedia call manager" or simply a "call manager") for setting up, modifying, and/or terminating calls between a live agent at an agent station 130 and a customer at a kiosk 110, as well as establishing a secure channel (using, e.g., a connection server process 178) over which messages and commands for effecting a synchronized web browsing session may be communicated. The call management process 172 may access and update memory tables 166 in a shared storage device. The multimedia session manager 170 may also include a web user interface process 174 which may be used to facilitate the establishment of an audio and/or video conference (or some other type of communications, such as text messages for example) over the network 190. Finally, the multimedia session manager 170 may include a data support services process 176 which may access and update database files 168, which may include customer information for example, in a database. Each of the components of the multimedia call center server 160 may be hardware, processor(s), storage devices, hardware and/or software interfaces, and/or software programs. An exemplary multimedia call center server 160 is described in more detail, later, in § 4.2.1.1.

Having introduced functions which may be performed by various components of the system 100 of FIG. 1, further details of the components are provided in §§ 4.2.1.1 through 4.2.1.4 below.

§ 4.2.1.1 Multimedia Call Center Server

The multimedia call center server 160 is largely responsible for managing the system 100. It may function to control the distribution of calls, perform user validation, manage network resources, monitor station clients, and store and/or create call usage records. More specifically, the multimedia call center server 160 may be used to login stations, such as agent stations 130 and kiosks 110 for example, manage call requests from kiosks 110, such as establishing a connection between a kiosk 110 and an appropriate, available, live agent at an agent station 130, permit live agents to transfer a customer call to another live agent, permit a live agent to chat with another live agent, transfer files, manage information requests, maintain a list of live agents, cancel a call request from a kiosk 110, disconnect a call between a kiosk 110 and an agent station 130, and log out stations, such as agent stations 130 and kiosks 110. Exemplary methods and data flows for each of these functions are set forth in the provisional patent application Ser. No. 60/151,793, already incorporated herein by reference. Further, under the present invention, the multimedia call center server 160, and in particular, a connection server process 178 of a call management process 172, may be used to facilitate the establishment of a secure channel between an agent station 130 and a kiosk 110 over which commands and messages for conducting a synchronized (web) browsing process may be communicated. This is typically done after a connection or call has already been established between the kiosk 110 and the agent station 130. Note that although the call may be an audio, video, and/or other data (such as text messaging for example) call, which may occur over a private or public network, the secure channel between an agent station 130 and a kiosk 110, over which commands and messages for conducting a synchronized web browsing process may be communicated, may be a public network, such as the Internet for example.

An exemplary method for effecting the connection server process 178 is described in § 4.2.1.1.5 below. First, however, an exemplary architecture of a the multimedia call center server 160 is described in § 4.2.1.1.1, exemplary database files and shared memory tables are described in §§ 4.2.1.1.2 and 4.2.1.1.3, respectively, below, and exemplary operation and administration system processes and architecture are described in § 4.2.1.1.4 below.

§ 4.2.1.1.1 Multimedia Call Center Server Architecture

The multimedia call center server 160 may be designed for use on a UNIX platform. The modules 162', 164' and 170' may use shared memory and semaphores as supported by the operating system. The use of shared memory ensures data stability and ease of recovery. It also allows for data sharing between processes.

Figure 3:
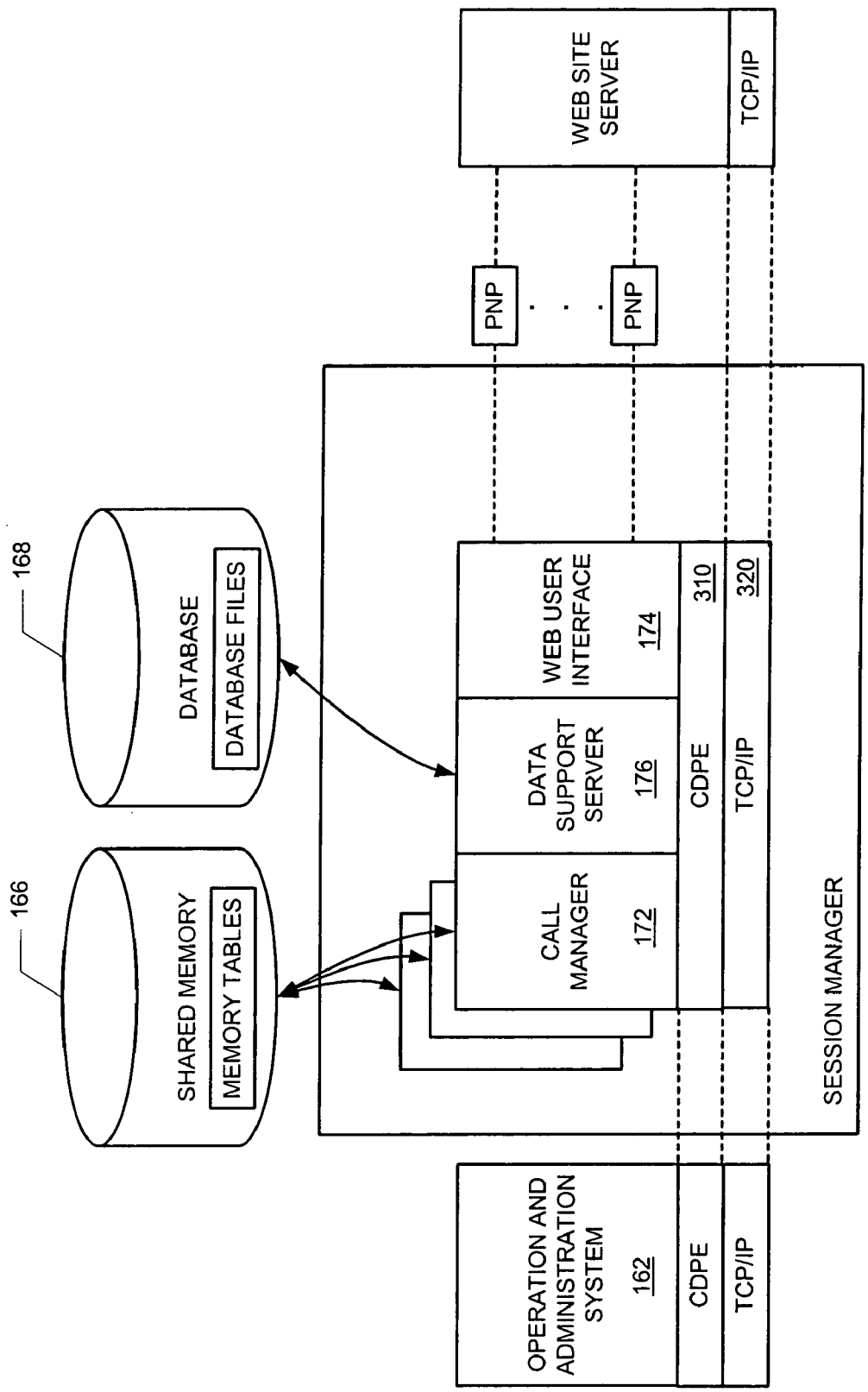
FIG. 3 is a block diagram of an exemplary session manager which may be used to effect at least some aspects of the present invention.

The multimedia call center server 160 may include two (2) main components—a multimedia session manager 170 and an operation and administration system 162. The session manager 170 is described in more detail in § 4.2.1.1.5 below. The operation and administration system 162 is described in more detail in § 4.2.1.1.4 below. As shown in FIG. 3, the session manager 170 and the operation and administration system 162 may communicate with one another via a CDPE (Concurrent Distributed Processing Environment) layer 310. The entire system may sit atop a TCP/IP (Transmission Control Protocol/Internet Protocol) stack 320.

§ 4.2.1.1.2 Database Files

Recall that user information may be stored, updated, and accessed by the operation and administration system 162. FIGS. 4 through 7 are exemplary data structures of files in the user information database 168. FIG. 4 illustrates a directory database which contains a list of all stations (e.g., kiosks 110 and agent stations 130) known to the session manager 170. The directory database is described in § 4.2.1.1.2.1 below. FIG. 5 illustrates a skill database which contains a list of all skills of agents known to the session manager 170. The skill database is described in § 4.2.1.1.2.2 below. FIG. 6 illustrates a category database which contains a list of all category names known to the session manager 170. Since the category database is not particularly relevant to the synchronized (web) browsing aspect of the present invention, it is not described in further detail here. Finally, FIG. 7 illustrates a private user group database which contains a list of all private user group names known to the session manager 170. Since the private user group database is not particularly relevant to the synchronized (web) browsing aspect of the present invention, it is not described in further detail here.

§ 4.2.1.1.2.1 Directory Database

The field names 410 of the directory database, as well as their size 420 and description 430, are set forth in FIG. 4. Note that each kiosk 110 or agent station 130 has a unique login name 440, an associated password 450, a unique port identifier 460, and a user name directory listing 470. Also note that the port identification 460 may also be referred to as the "address" of the station.

§ 4.2.1.1.2.2 Skill Database

The field names 510 of the skill database, as well as their size 520 and description 530, are set forth in FIG. 5. The skill database stores primary video conferencing protocols 540 and addresses 545, secondary video conferencing protocols 550 and addresses 555, and default video conferencing protocols 560 and addresses 565.

§ 4.2.1.1.3 Shared Memory Tables

Memory tables are data structures that reside in shared memory 166. They are initialized upon startup of the call management process 172 and are accessible by the call management process 172. Having multiple instances of the call management process 172 permits data sharing. FIG. 8 is a station table 800, FIG. 9 is an active call table 900, and FIG. 10 is a skill table 1000. Each is described in more detail below.

A station table 800 contains information related to a station, such as a kiosk 110 or a agent station 130 for example. The station table 800 illustrates field names 810, and their type 820, size 830, and description 840. As shown in FIG. 8, the station table 800 may include a login name 852 for the station, an associated password 854, a unique stations port identifier 856, a video conferencing protocol type identifier 862, a video conferencing address 864, an alternative video conferencing protocol type identifier 866, an alternative video conferencing address 868, an internet protocol (or "IP") address 870 of the station, an encryption type 882 employed by the station, and an (public) encryption key 884 disseminated by the station.

The active call table 900 contains information related to an established call. Since the active call table 900 is not particularly relevant to the understanding of the invention, it is not described in further detail. The skill table 1000 contains information related to the known skills. Since the skill table 1000 is not particularly relevant to the understanding of the invention, it is not described in further detail.

§ 4.2.1.1.4 Operation and Administration System Processes and Architecture

The operation and administration system 162 may facilitate all administration-related tasks. These tasks may include generating reports, setting up resources, and managing the database 168. Recall from FIG. 3 that the operation and administration system 162 may communicate with other components via the CDPE layer 310. Since the details of the operation and administration system 162 are not necessary for understanding the present invention, it is not described in further detail.

§ 4.2.1.1.5 Call Management and Connection Server Processes

Before describing an exemplary method for effecting a connection server process 178 for establishing a synchronized (web) browsing session in § 4.2.1.1.5.3 below, since such a method is typically effected after the kiosk 110 and agent station 130 are logged in and a call between the kiosk 110 and the agent station 130 has been established, exemplary methods of logging in stations and establishing calls, performed by the multimedia session manager 170 and call manager 172' are first introduced in §§ 4.2.1.1.5.1 and 4.2.1.1.5.2 below.

§ 4.2.1.1.5.1 Station Login

Figure 11:
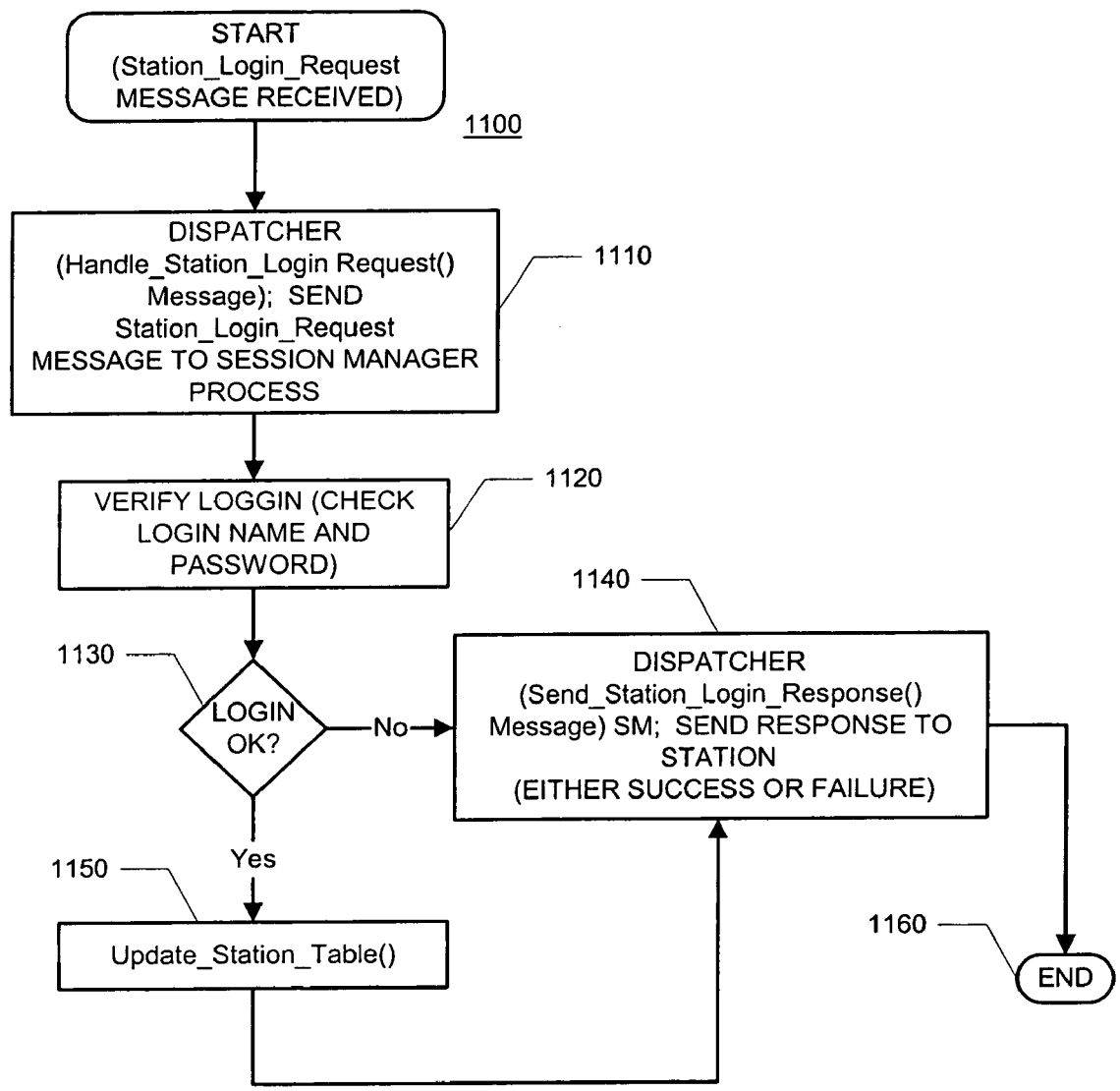
FIG. 11 is a flow diagram of an exemplary method for logging in kiosks and/or agent stations in a system, such as the system of FIG. 1.
Figure 12:
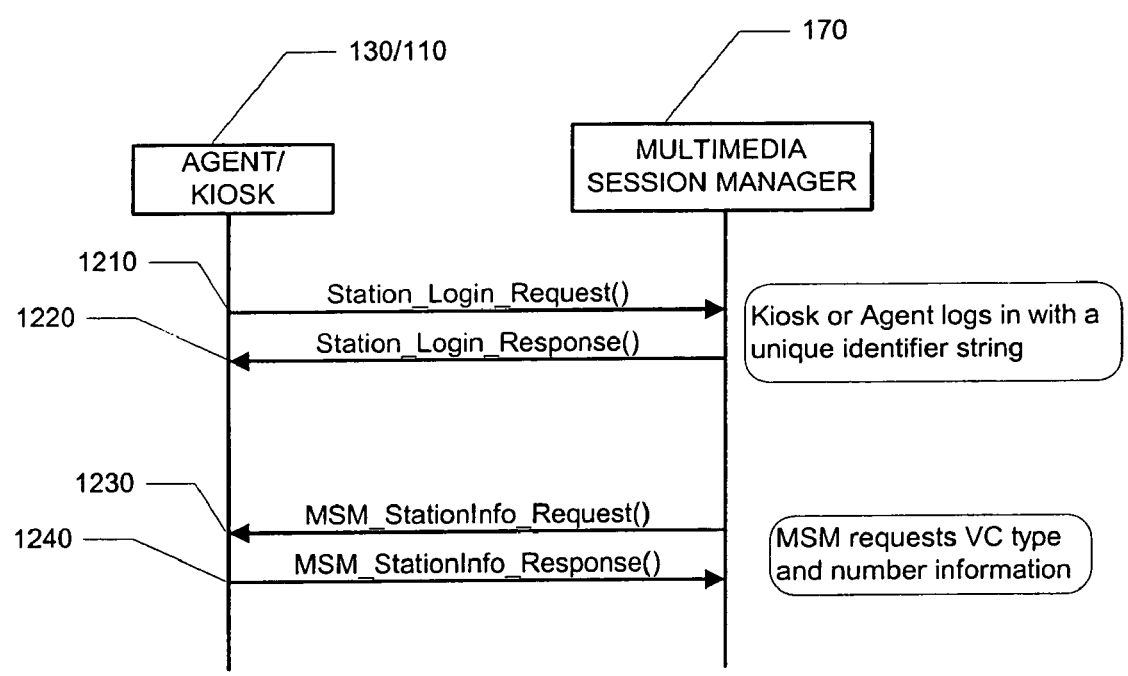
FIG. 12 is a messaging diagram of communications which may occur in an exemplary method for logging in kiosks and/or agent stations in a system, such as the system of FIG. 1.

The process of logging in a station is described with reference to both FIGS. 11 and 12. FIG. 11 is a flow diagram of an exemplary method 1100 for logging in a station such as a kiosk 110 or an agent station 130. FIG. 12 is a messaging diagram which illustrates communications between a station, such as an agent station 130 or a kiosk 110, and the multimedia session manager 170 in general. In response to a Station_Login_Request message 1210, the method 1100 is invoked and the Station_Login_Request message 1210 is sent to the session manager 170 as shown in step 1110. The Station_Login_Request message 1210 may include a header, an address (recall unique port ID 460, 856 of the station), a station login identifier, an associated password, and a version of an application running on the station. The session manager 170 then checks the login name and password as shown in step 1120. If the login is not valid, the session manager 170 returns a Station_Login_Response communication 1220 as shown in steps 1130 and 1140. This response 1220 may include a header, a response code, an error code, a directory version, a configuration version, a multimedia version, an application version, and an attract loop version. If the login is valid, the session manager 170 updates that station table 800 as shown in steps 1130 and 1150 and returns a Station_Login_Response communication 1220 as shown in step 1140.

As is further shown in FIG. 12, the multimedia session manager 170 may further send an MSM_StationInfo_Request message to the station as shown in communication 1230. In response, the station may return an MSM_StationInfo_Response message to the multimedia session manager 170 as shown in communication 1240. The MSM_StationInfo_Response message 1240 may include a header, an address of the station, a response code, and error code, a video conferencing protocol, a video conferencing address, an alternative video conferencing protocol, an alternative video conferencing address, an IP address, a port number, and encryption type, and an (e.g., public) encryption key.

As can be appreciated, using the login process, the multimedia session manager 170 now has access to information about all logged in kiosks 110 and agent stations 130. This information may stored in a station memory table 800 and used by the multimedia session manager 170 to establish video conferences between the stations, as well as to allow the stations to exchange encrypted information.

Figure 13:
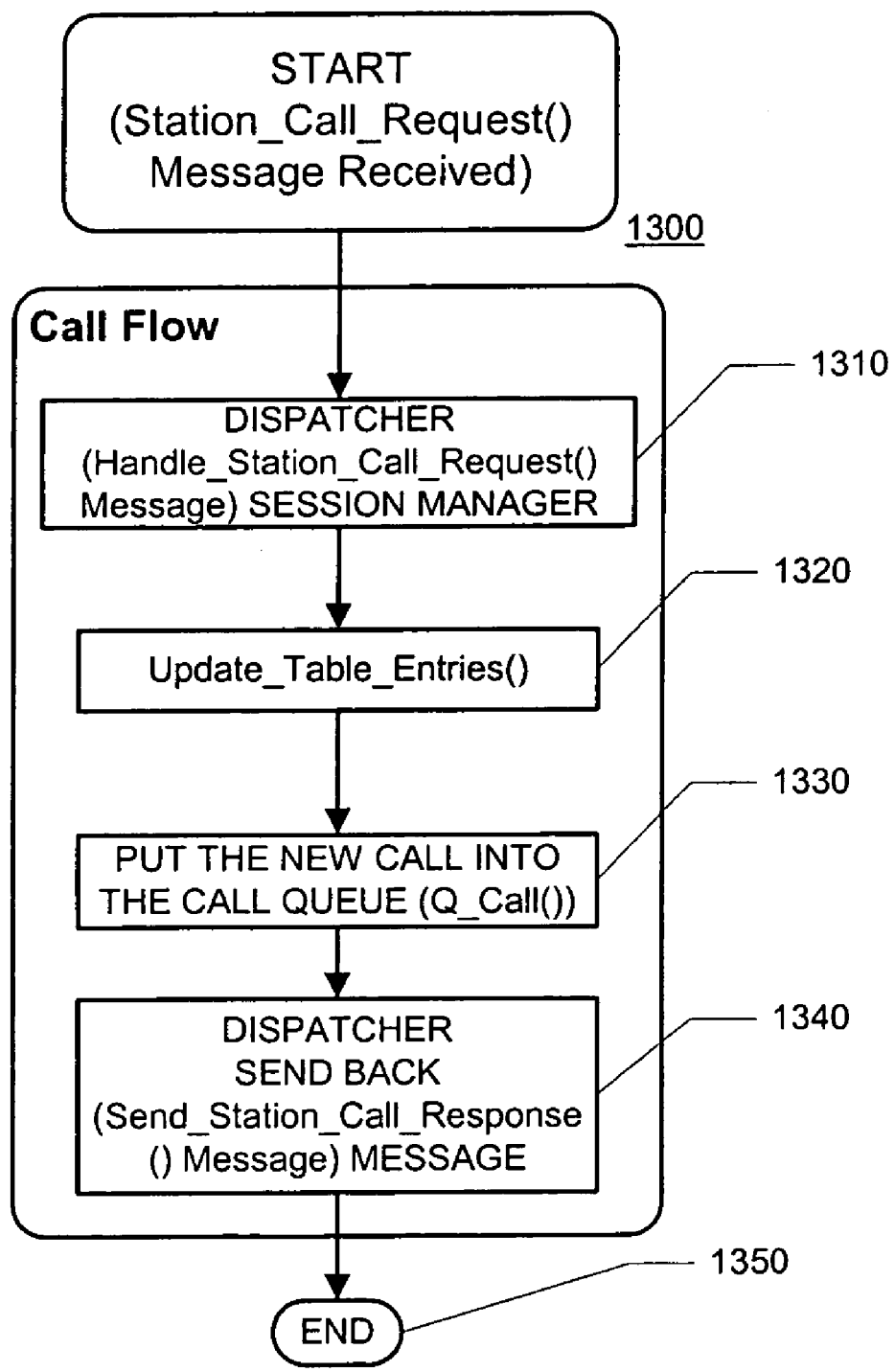
FIG. 13 is a flow diagram of an exemplary method for setting up a call between a kiosk and an agent station in a system, such as the system of FIG. 1.
Figure 14:
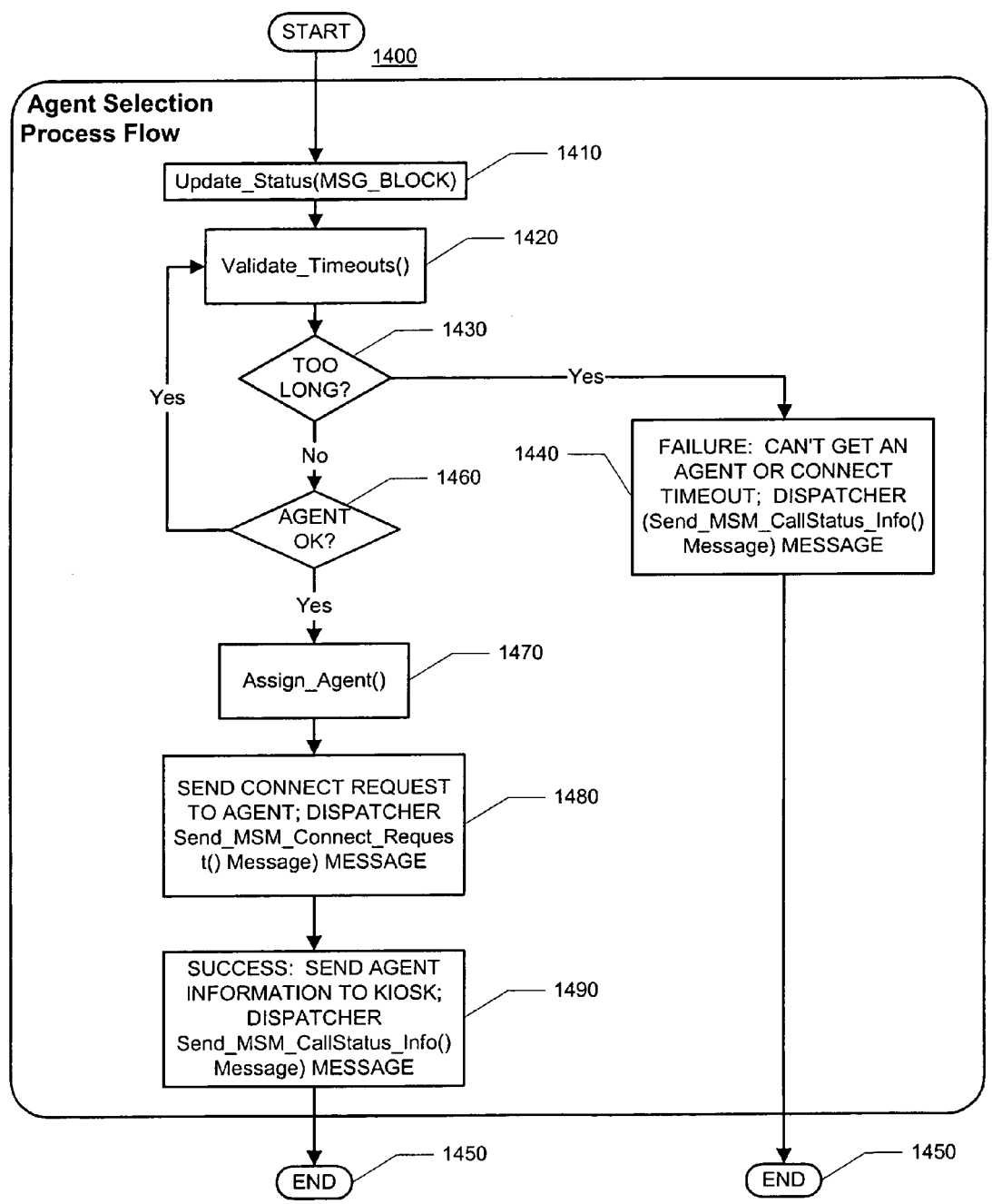
FIG. 14 is a flow diagram of an exemplary method for selecting an appropriate agent in response to a call request by a kiosk in a system, such as the system of FIG. 1.
Figure 15:
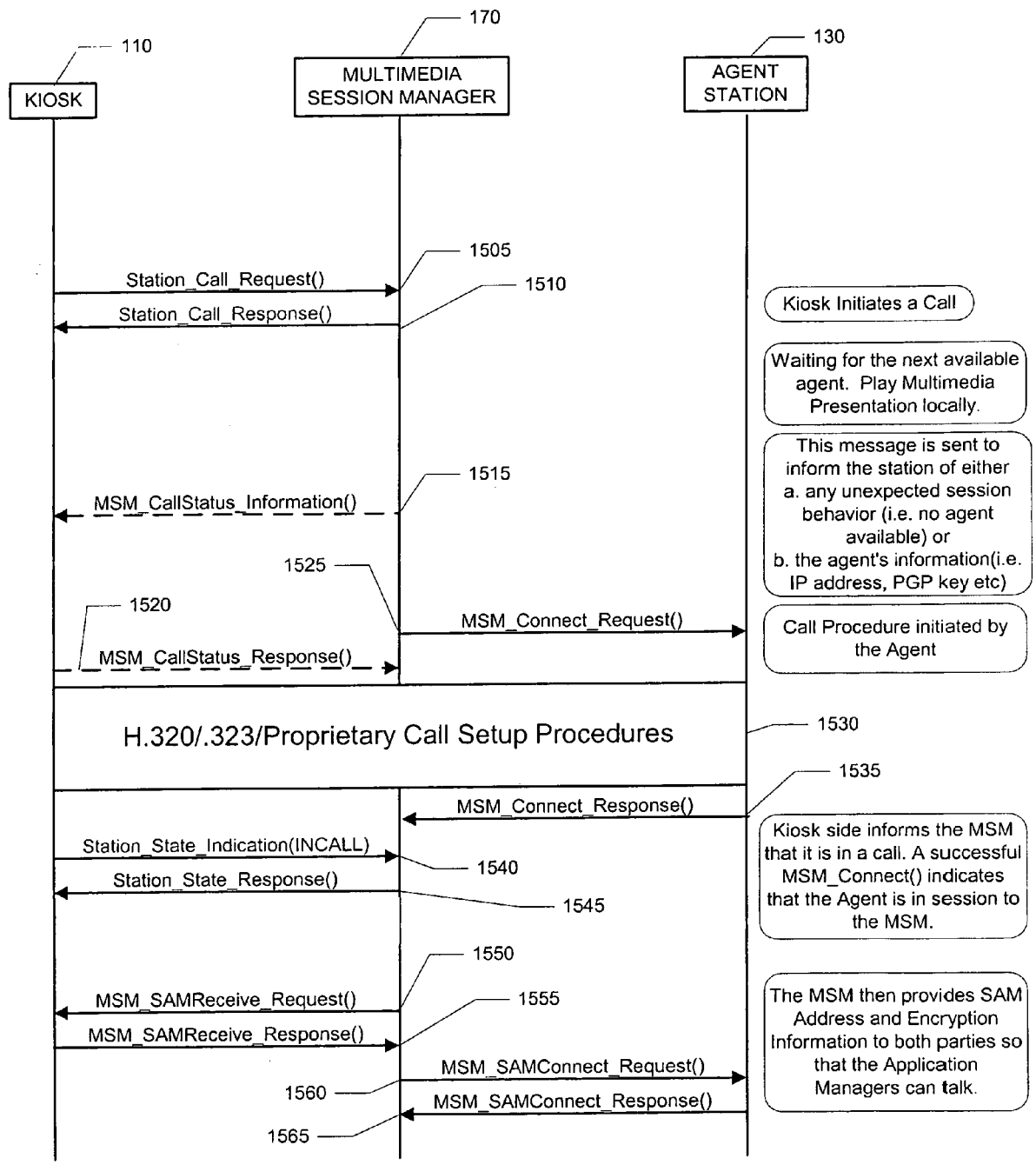
FIG. 15 is a messaging diagram of communications which may occur in an exemplary method for setting up a call between a kiosk and an agent station in a system, such as the system of FIG. 1.

The process of establishing a call between two stations is described with reference to FIGS. 13 through 17. FIGS. 13 and 14 are flow diagrams of exemplary methods 1300, 1400 for establishing a call to an agent station 130. FIG. 15 is a messaging diagram which illustrates communications between a station, such as an agent station 130, a kiosk 110, and the multimedia session manager 170 for establishing a call.

FIG. 13 is a flow diagram of an exemplary method, which may be carried out by the multimedia session manager 170 for example, for handling call requests, such as call requests received from kiosks 110 for example. Referring to both FIGS. 13 and 15, first, as shown in step 1310 and communication 1505, the multimedia session manager 170 receives a Station_Call_Request. This request may have been sent from a kiosk 110 as shown in FIG. 15. The Station_Call_Request message may include a header and an address of the station. In response, memory table 166 entries may be updated a shown in step 1320 and the new call is placed into a call queue as shown in step 1330. FIG. 16 illustrates an example of such a call queue 1600. The multimedia session manager 170 may then send out a Station_Call_Response message as shown in step 1340 and communication 1510. This Station_Call_Response message may include a header, a response code, an error code, a position in the call queue, and a number of waiting calls. The number of waiting calls information may be made available to agents. This information may depend on a given agent's skill set(s), as well as a waiting time as will become apparent from a later discussion which refers to FIG. 17. The method 1300 then ends as shown by node 1350. However, referring to method 1400 of FIG. 15, as well as FIG. 15, the status of a message block is updated as shown in step 1410.

Having described an example of how stations are logged in, an example of how station-to-station calls are established is described in § 4.2.1.1.5.2 below. Then, an exemplary method for effecting a connection server process 178 for establishing and maintaining a synchronized (web) browsing process will be described in § 4.2.1.1.5.3.

§ 4.2.1.1.5.2 Station to Station Call Setup

Before the call establishment method of FIG. 14 and the messaging illustrated in FIG. 15 are described further, the notion of skill groups and how skill groups affect call distribution is introduced.

Each skill group represents a core skill that an agent may have. Skill groups have attributes such as skill name, primary timeout, secondary timeout, overflow timeout and fail-over information. (See, e.g., FIG. 5.) These attributes may be used to tailor the call distribution process to the precise requirements of individual situations. Skill groups may be added, deleted and configured through the operation and administration system 162.

Service listings are "buttons" that appear on the screen of a kiosk 110. ("Used Car Loan" is an example of a service listing.) Each service listing requires the attention of an agent from a particular skill group. Service listings may be members of one or more private user groups (or "PUGs"). Service listings may be added, deleted and configured through the operation and administration system 162.

Distinctions between service listing and skill group are illustrated in the following examples. Consider, for example, that two buttons—"New Car Loan" and "Used Car Loan"—are to appear on the kiosks 110. However, the same group of agents who specialize in "Car Loans" handles the calls related to both buttons. In this case, "New Car Loans" and "Used Car Loans" are service listings while "Car Loan" is a skill group. Further consider in this example, that in the Boston area, "Used Car Loans" are referred to as "Pre-owned Car Loans". By combining the use of private user groups and service listings, a "Pre-owned Car Loan" button can be provided on kiosks 110 in the Boston area even though the same group of agents as above handles the calls. In the Philadelphia area, it may be desired to combine all "Loans" onto one "button" in the main screen of the kiosk 110. When the customer chooses the "Loans" button, it may be desired to present them with a secondary menu with, "New Car Loan", "Used Car Loan" and other loans. This too can be achieved very effectively using service listings.

Figure 17:
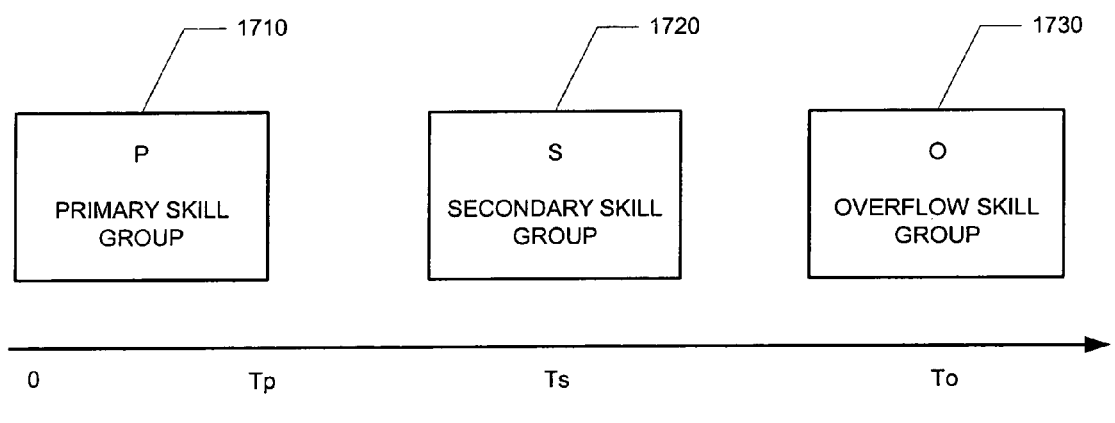
FIG. 17 illustrates a time out process for selecting a live agent based on their skills.

Having introduced the notions of skill groups and service listings, ways in which skill groups may affect call distribution is now introduced. When a customer at a kiosk 110 wishes to communicate with an agent (by touching a service button for example), the kiosk 110 sends a request to the multimedia session manager 170 as described above. The multimedia session manager 170 tries to find an agent with the required skill as their primary skill to handle the call. If such an agent is not available, the call is held in a queue. Referring to FIG. 17, during a primary timeout period $(0-T_p)$, the call is offered only to agents that have the required skill as their primary listing 1710. As time elapses (primary timeout $(T_p)$, secondary timeout $(T_s)$), the call is progressively offered to agents that have the required skill as their secondary 1720 and overflow 1730 listing as well. The overflow skill group 1730 may be a low-skill group that provides a backup answer mechanism. Agents in this group may therefore gather information from the caller that will be passed on to an agent with higher skills as soon as one becomes available.

With these notions of skill groups, time out periods, and their affect on call distribution in mind, referring back to FIGS. 14 and 15 steps 1420, 1430 and 1460 perform the agent selection function illustrated in FIG. 17. If no agent is assigned within a given period, the multimedia session manager sends an error MSM_CallStatus_Information message to the station that requested the call, as shown in steps 1430 and 1440 and communication 1515. This message 1515 may include a header and status information. In response, the kiosk may send an MSM_CallStatus_Response message as shown by communication 1520. This message 1520 may include a header, an address of the kiosk 110, a response code, and an error code. Assuming, on the other hand, that an appropriate agent is available within one of the timeout periods, such an agent is assigned as shown in step 1470 and the multimedia session manager sends an MSM_Connect_Request message to the agent station 130 as shown in step 1480 and communication 1525. This message 1525 may include a header, a caller ID, a callee ID, a service ID, a video conferencing protocol, and a video conferencing address. Then, the multimedia session manager 170 sends a successful MSM_CallStatus_Info message to the kiosk 110 that requested the call as shown in step 1490. This message may include information about the agent station 130 (such as IP address and public key for example) to which the call was assigned.

At this point, since the agent station 130 has information (such as its IP address, the video conferencing protocol(s) it supports, etc.) about the calling station (such as a kiosk 110), it sets up a call as shown in step 1530. The agent station 130 can send an MSM_Connect_Response message back to the multimedia session manager 170 as shown by communication 1535. This message 1535 may include a header, an address of the agent station 130, a response code and an error code, and may be used to notify the multimedia session manager 170 that a connection is about to be started. The calling station (such as a kiosk for example) can send a Station_State_Indication(INCALL) message to the multimedia session manager 170 as shown in communication 1540. This message informs the session manager 170 that the caller station 110 has changed states and may include a header, an address of the calling station and a state. Other possible states include WRAP_UP, BREAK, PPCALLS, and READY. In response, the multimedia session manager may send a Station_State_Response message, as shown in communication 1545 back to the caller station 110. This message may include a header, a response code, and an error code, and is basically an acknowledgement of the Station_State_Indication(INCALL) message 1540.

Now, the multimedia session manager 170 may provide station application manager (or "SAM") address and encryption information to both the caller station (such as a kiosk 110 for example) and the agent station 130 so that the customer at the caller station and an agent at the agent station 130 can communicate via the application managers. More specifically, the multimedia session manager 170 can send an MSM_SAMReceive_Request message to the caller station (such as a kiosk 110 for example) as shown in communication 1550. This message 1550 may include a header, an IP port address of the agent station 130, a port number, an encryption type and public key, and a category flag. Basically, this message informs the caller station that it needs to listen for a TCP/IP connection from the specified IP Address-Port Number. The encryption information permits the caller station to successfully communicate with the remote link. Thus, this encryption information may be used to secure a synchronized (web) browsing session between the agent station 130 and the kiosk 110. In response, the caller station (such as a kiosk 110 for example) may send an MSM_SAMReceive_Response message back to the multimedia call manager 170 as shown in communication 1555. This message 1555 may include a header, an address of the caller station, a response code, and an error code and basically acknowledges receipt of the MSM_SAMReceive_Request message 1550 by the caller station. The multimedia session manager 170 can also send an MSM_SAM-Connect_Request message to the agent station 130 as shown in communication 1560. Like the MSM_SAMReceive_Request message 1550, this message 1560 may include a header, an IP address, a port number, an encryption type and key, and a category flag. Similarly, this message basically informs the agent station 130 that it should make a TCP/IP connection to the specified IP Address-Port Number. The encryption information permits the station to successfully communicate with the remote link. Thus, this encryption information may be used to secure a synchronized (web) browsing session between the agent station 130 and the kiosk 110. In response, the agent station may provide an MSM_SAMConnect_Response message as shown in communication 1565. This message may include a header, an address of the agent station, a response code and an error code and basically acknowledges receipt of the MSM_SAMConnect_Request message 1550 by the agent station 130.

Having described exemplary methods of logging in stations and establishing station to station calls, an exemplary method for establishing a synchronized (web) browsing session between an agent station 130 and a customer terminal station, such as a kiosk 110 for example, is described in § 4.2.1.1.5.3 below.

§ 4.2.1.1.5.3 Connection Server (For Secure Synchronized Web Browsing)

Figure 18:
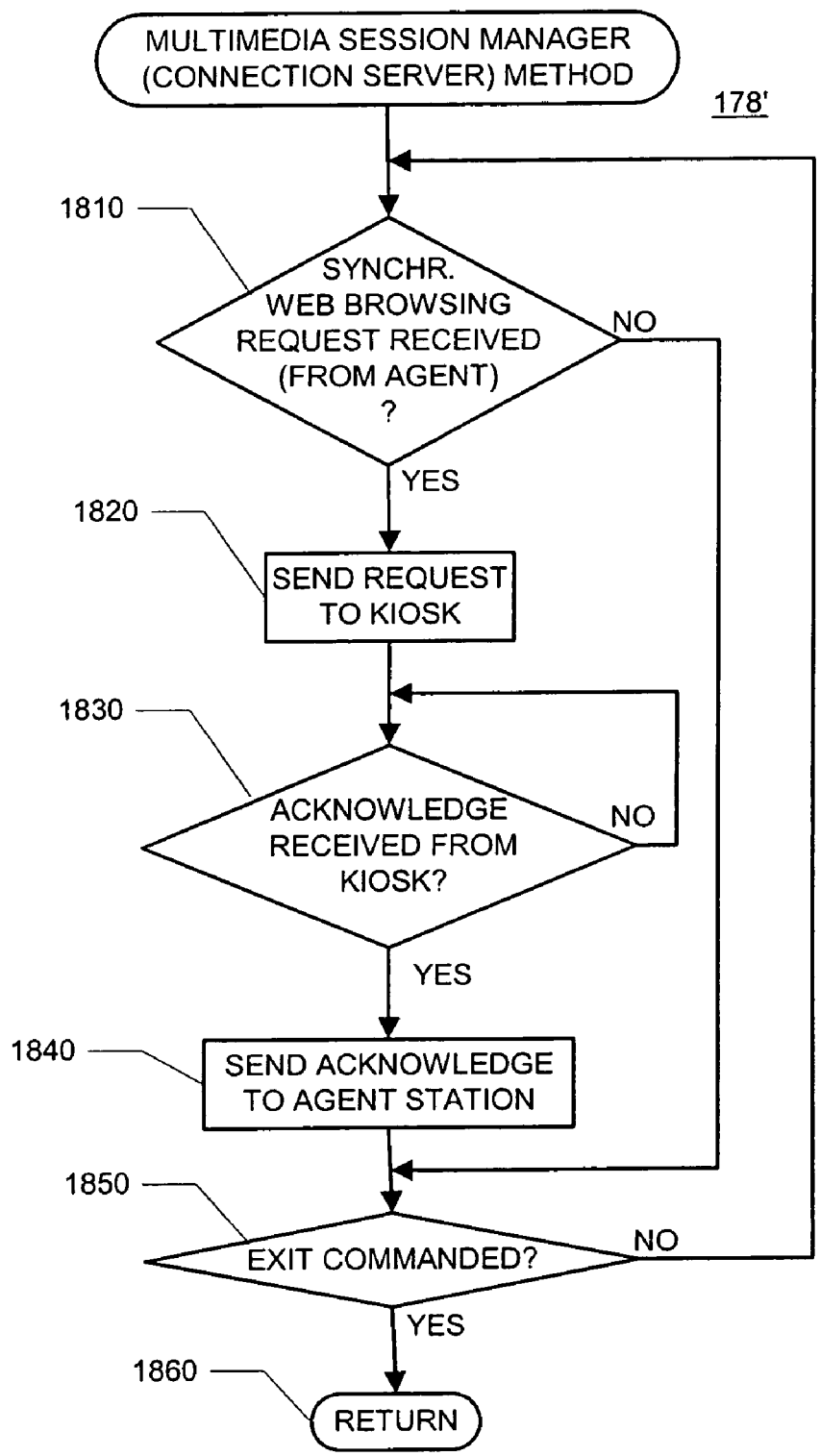
FIG. 18 is a flow diagram of an exemplary method for operating a multimedia session manager in a system, such as the system of FIG. 1.

FIG. 18 is a flow diagram of an exemplary method 178' for establishing a (secure) synchronized (web) browsing session between a customer terminal (such as a kiosk 110 for example) and an agent station 130. This method 178' illustrates steps that may be performed by the multimedia session manager 170. First, at decision branch point 1810, it is determined whether or not a synchronized (web) browsing request was received from an agent station 130. If not, the method 178' branches to decision branch point 1850 (described later). If so, the method 178' branches to step 1820 which sends a request to the customer terminal (e.g., the kiosk 110). Typically, this kiosk 110 may already have a call established with the agent station 130. The multimedia session manager 170 then waits for an acknowledge response from the customer terminal (e.g., the kiosk 110). Although not shown in FIG. 18, if no acknowledge response is received from the customer terminal (e.g., the kiosk 110) within a predetermined period of time, the method 178' is left under a "timeout" condition. If, as shown in decision branch point 1830, it is determined that an acknowledge response was received from the customer terminal (e.g., the kiosk 110), then an acknowledge is sent to the agent station 130 which initially requested the synchronized (web) browsing session as shown in step 1840. Next, at decision branch point 1850, it is determined whether or not an exit is commanded. If not, the method 178' continues to decision branch point 1810. Otherwise, the method 178' is left via RETURN node 1860. If the method 178' is event driven and invoked when a synchronized web browsing request is received, the method 178' will not need the decision branch points 1810 and 1850.

Figure 19:
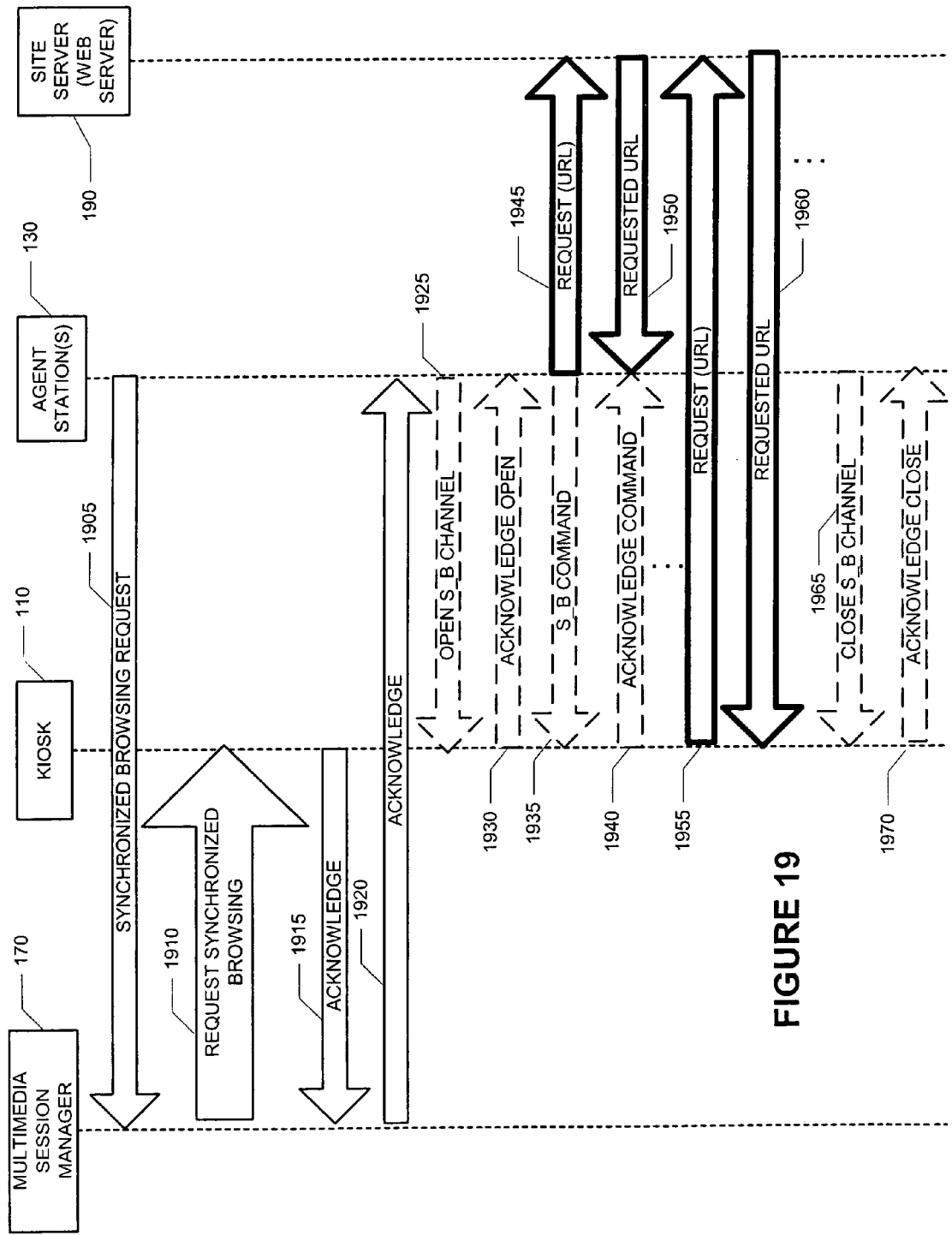
FIG. 19 is a messaging diagram of communications which may occur in an exemplary method for establishing and effecting a (secure) synchronized browsing session between a customer and a live agent.

Referring to FIG. 19, the method 178' is illustrated by the synchronized browsing request message 1905 from the agent station 130 to the multimedia session manager 17.0, the request synchronized browsing request message 1910 from the multimedia session manager 170 to the kiosk 110, the acknowledge response message 1915 from the kiosk 110 to the multimedia session manager 170, and the acknowledge response message 1920 from the multimedia session manager 170 to the agent station 130.

Having described the multimedia session manager, kiosk processes and architecture are now described in § 4.2.1.2 below. Then, agent station processes and architecture are described in § 4.2.1.3 and web site server processes and architecture are described in § 4.2.1.4.

§ 4.2.1.2 Kiosk Processes and Architecture

Recall from § 4.2.1 above that a kiosk 110 may function to permit a customer to interact with a live agent. Recall that such customer-live agent interactions may take place via video, audio and/or data (e.g., text messages) communications. The recall further that a live agent can control the kiosk 110 to display information to the customer via the (web) browser and display device. The kiosk 110 may also function to invoke the establishment of a connection between it and an agent station 130. Further, the kiosk 110 may function to encrypt (using a public key of the agent station 130 for example) communications sent from it. Furthermore, the kiosk 110 may function to control access to content, such as web pages for example.

Referring back to FIG. 2, recall that these functions may be effected by a processor(s) 210, a storage device(s) 230 (such as RAM, ROM, magnetic, optical, and/or magneto-optic disks, and magnetic tape for example), input/output interfaces 220, an input device(s) 250 (such as a keyboard, a keypad, a pointing device, a microphone, a card reader, a signature capture device, a scanner, such as a flatbed scanner for example, a touch screen and/or a video camera for example), an output device(s) 260 (such as a monitor, a printer, a check printer and/or a speaker(s) for example), and a system bus or network 240. The processor(s) 210, input/output interface(s) 220, and storage device(s) 230 may communicate with one another via the system bus or network 240. Thus, for example, the functions which may be performed by the customer terminal may be effected by a personal computer.

Finally, and most importantly in terms of the present invention, recall that the (web) browsers in both a kiosk 110 and an agent station 130 can be synchronized so that the same information is displayed on, or the same URL can be addressed by, both the kiosk 110 and the agent station 130 at about the same time. The live agent operating the agent station 130 can enable and/or disable the synchronized (web) browsing feature.

Figure 20:
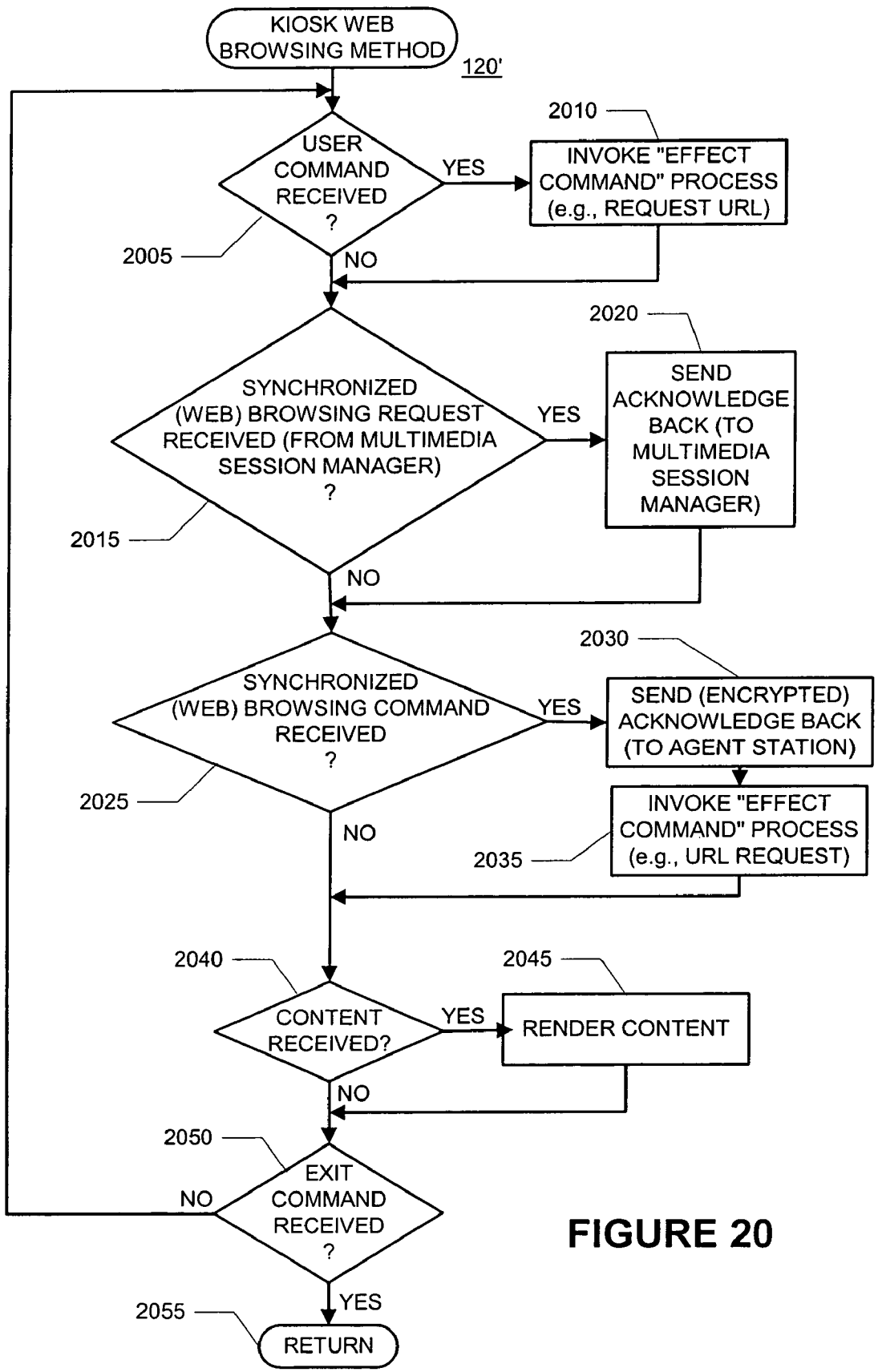
FIG. 20 is a flow diagram of an exemplary method for operating a kiosk in a system, such as the system of FIG. 1.

FIG. 20 is a flow diagram of an exemplary method 120' which may be used to effect the kiosk (web) browsing process 120. At decision branch point 2005, it is determined whether or not a user (web) browsing command is received from the customer at the terminal. If so, an "effect command" process (described later) is invoked as shown in step 2010 and the method 120' continues to decision branch point 2015. Otherwise, if no user (web) browsing command is received from the customer at the terminal, then the method 120' proceeds directly to decision branch point 2015.

At decision branch point 2015, it is determined whether or not a synchronized (web) browsing request is received (for example, from the multimedia session manager 170). If so, an acknowledge message is returned (for example, to the multimedia session manager 170) as shown in step 2020, and the method 120' proceeds to decision branch point 2025. Referring back to FIG. 19, these steps are illustrated by messages 1910 and 1915. If, on the other hand, a synchronized web browsing request is not received, then the method 120' proceeds directly to decision branch point 2025.

At decision branch point 2025, it is determined whether or not a synchronized (web) browsing command is received (for example, from the agent station 130 that requested the synchronized web browsing session). If so, an acknowledge reply may be encrypted (by encryption process 124) and returned to the agent station 130 as shown in step 2030 and the "effect command" process (described later) may be invoked as shown in step 2035. The method 120' then continues to decision branch point 2040. Referring once again to decision branch point 2025, if a synchronized (web) browsing command is not received, then the method 120' continues directly to the decision branch point 2040.

At decision branch point 2040, it is determined whether any content (such as HTML web pages, audio streams, video streams, GIF images, JPEG images, etc., for example) has been received. If so, the content is rendered by the customer terminal as shown in step 2045 and the method 120' proceeds to decision branch point 2050. Otherwise, the method 120' proceeds directly to decision branch point 2050.

At decision branch point 2050, it is determined whether or not an exit browser command has been received. This command, most likely, will originate from the customer at the terminal, but may, conceivably, come from the multimedia session manager 170 or the agent station 130. If an exit browser command has been received, the method 120' is left via RETURN node 2055. Otherwise, the method 120' branches to decision branch point 2005, already described above.

Figure 21:
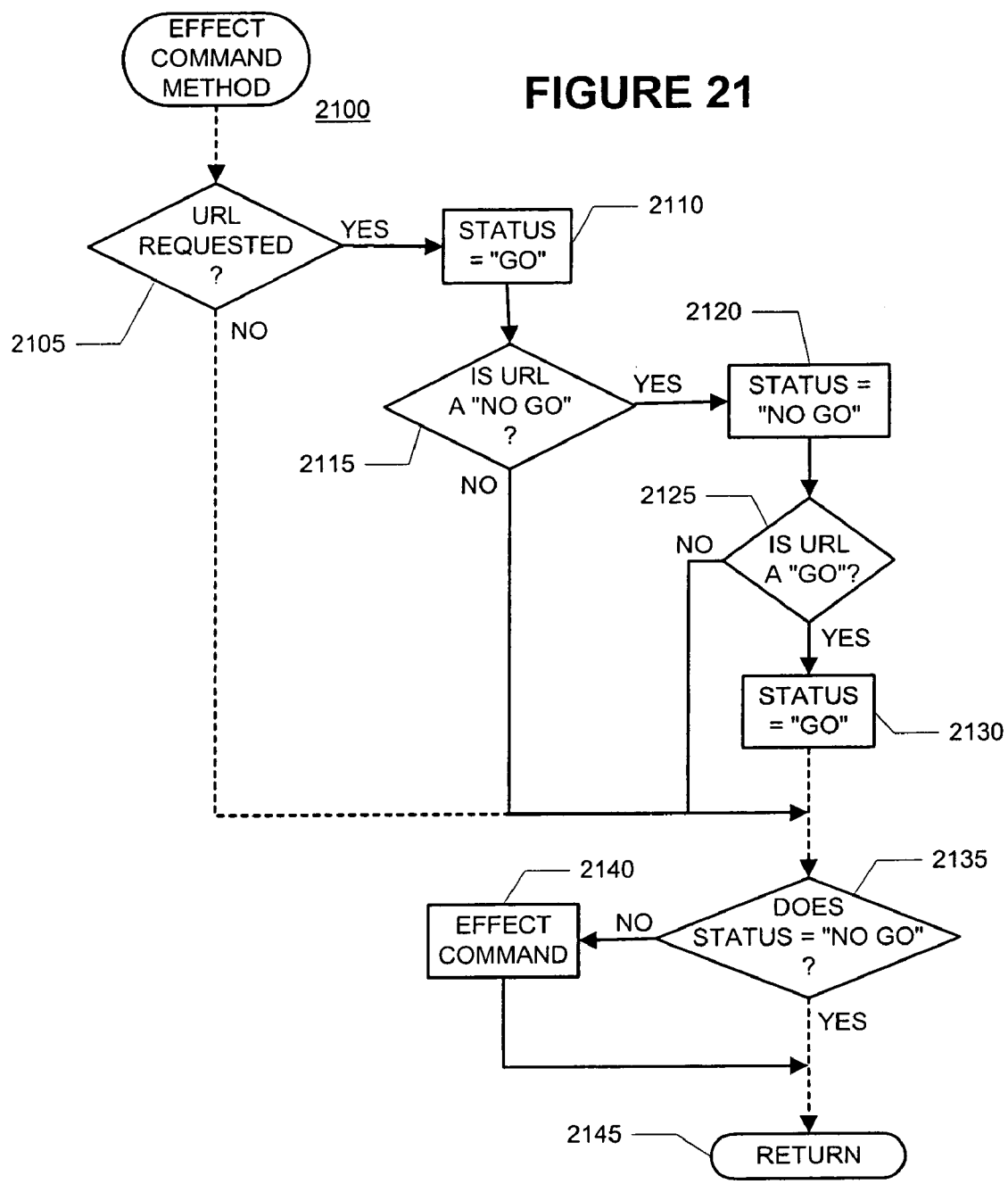
FIG. 21 is a flow diagram of an exemplary method for controlling access to content.

Recall that if a user command was received (decision branch point 2005) or if a synchronized (web) browsing command was received (decision branch point 2025), an "effect command" process was invoked. FIG. 21 is a flow diagram of a portion of an exemplary method 2100' for effecting this effect command process. As will be apparent, this exemplary method 2100' also effects the access control process 126 using GO/NO GO lists and/or rules 128. As indicated by the dotted lines, the method 2100' may include additional steps which are not shown. Basically, the steps of the method 2100' which effect the access control process 126 are shown.

At decision branch point 2105, it is determined whether or not content associated with a universal resource locator (or "URL") was requested. If so, the steps related to the access control aspect of the method 2100' are entered. More specifically, an access control status of the kiosk is initialized to GO in step 2110 and the method 2100 continues to decision branch point 2115. (The status may be initialized to NO GO as will be explained below). At decision branch point 2115, it is determined whether or not the URL is a NO GO, based on the NO GO contents of the list (and/or rules) 128. If not, the method continues directly to decision branch point 2135 which is described later. If, on the other hand, the URL is a NO GO, then the kiosk's access control status is set to NO GO as shown in step 2120 and the method 2100 continues to decision branch point 2125. At decision branch point 2125, it is determined whether or not the URL is a GO, based on the GO contents of the list (and/or rules) 128. If so, the kiosk's access control status is changed back to GO, as shown in step 2130 and the method 2100 proceeds to decision branch point 2135. Otherwise, the method continues directly to decision branch point 2135. Note, as indicated by the dotted lines, other method steps, though not shown and not related to access control, may be performed before decision branch point 2135.

At decision branch point 2135, it is determined whether or not the kiosk's access control status is a NO GO. If not, the command is effected as shown in step 2140 and the method 2100 is left via RETURN node 2145. Otherwise, if the control access status is a NO GO, the method 2100 is left via RETURN node 2145 without effecting the command.

As can be appreciated from the description of FIG. 21, the method 2100 limits access to content. It is interesting to note that a URL can be on both a NO GO and a GO. This allows the access control to filter out a large amount of content, and then allow back a smaller selected group of content or specified content. This aspect of the present invention may be best understood with reference to the exemplary GO/NO GO list (and/or rules) 128' of FIG. 22 and the Venn diagram of FIG. 23. In the exemplary list/rule of FIG. 22, any URL with an "http:" prefix or a ".com" extension may be a NO GO. However, specified URLs or groups of URLs may be considered GO based on a list and/or rules. Referring to the Venn diagram of FIG. 23, label 2310 denotes all content, label 2320 denotes NO GO content, label 2332 denotes specific GO content (e.g., listed), and label 2334 denotes groups of GO content (e.g., as defined by rules). Thus, GO content can be a sub-set of NO GO content. Referring back to FIG. 21, this is why the access control status can be changed back to GO from NO GO as shown in steps 2120, 2125 and 2130. Notice also from the Venn diagram that the NO GO content can be all, almost all, or not quite all of the content. Referring back to FIG. 21, if steps 2110 and 2115 are removed, the kiosk's access control status is set to NO GO as a default. In this case, referring to FIG. 23, the NO GO content 2320 would coincide with all content 2310.

The access control process 126 of the web site server process 120 may be therefore be thought of as a filter. However, this filter operates differently from known filters. FIG. 24 is a Venn diagram which illustrates known content filters. Basically these filters allow all content 2410 except for certain specific content 2432 (e.g., a specified hate group web site) or certain types of content 2434 (e.g., words that may indicate that the web site contains pornographic materials).

Although the access control was shown as being applied to requests for content attempting to go out from the kiosk 110, the access control may be applied to content attempting to come into the kiosk 110, though the former technique is preferred.

Although customer actions in the present invention have been described as taking place through a kiosk, other types of terminals may be used. Thus, the term kiosk, as used in this specification, is to be interpreted as including many possible types of terminals, such as a personal computer with an Internet connection for example.

Having described an exemplary customer terminal 110, an exemplary agent station 130 is described in § 4.2.1.3 and an exemplary web site server 120 is described in § 4.2.1.4 below.

4.2.1.3 Agent Station Processes and Architecture

Recall from § 4.2.1 above that the agent stations 130 may function to permit a live agent to assist a customer at a kiosk 110. Recall further that such assistance may take the form of audio, video, and/or data (e.g., text message) communications, as well as synchronized (web) browsing in which the agent station 130 acts as a guide terminal and the kiosk 110 acts as a follower terminal. The agent station 130 may also function to invoke the establishment of a connection between it and another terminal, such as a kiosk 110 or another agent station 130. Further, the agent station 130 may function to encrypt (using a public key for example) communications sent from it. Furthermore, the agent station 130 may function to control access to content, such as web pages for example. An agent station 130 may further function to permit a live agent to control kiosk peripherals, access customer information from a database 168, update customer information, send and receive messages to and from other live agents, transfer customers to another live agent, and access call information. These functions, which may be performed by the agent station 130, may be effected by the devices discussed above with reference to FIG. 2. In an exemplary embodiment, agent stations 130 may include a (web) (e.g., HTML) browser process 150 which is similar to the (web) browser process 120 included in the kiosks 110, as well as a synchronized (web) browsing process 140.

Recall that the (web) browsers in both a kiosk 110 and an agent station 130 can be synchronized so that the same information is displayed on, or the same URL can be addressed by, both the kiosk 110 and the agent station 130 at about the same time. The live agent operating the agent station 130 can enable and/or disable the synchronized (web) browsing feature.

In view of the foregoing, a live agent can view scanned identification documents, interpret them, and manually enter name, address and other information obtained from the identification documents into one or more forms, e.g., credit applications, purchase forms, etc. Since communication between the kiosk 110 and the agent stations 130 may be provided over a secure, e.g., encrypted data channel, confidential information may be exchanged without fear of unauthorized interception. Thus, for example, completed application or purchase forms can be transmitted to a kiosk 110, a signature on the form captured, and payment received without security concerns. In addition, a live agent can control the printing of checks, money orders, etc. at the kiosk 110. Thus, for example, if a loan application is approved, the customer can be provided the money in the form of a check issued directly from the kiosk 110. Furthermore, a live agent can fill out service and/or purchase forms based on, e.g., customer information obtained via scanned identification documents, and control the kiosk 110 to print the completed form. A customer's signature on a completed form can be captured using the kiosk's signature capture device and the completed form with signature can be printed at the kiosk 110 as well as the agent station 130. The flat bed scanner can be used to acquire images of driver's licenses, credit cards and other forms of identification.

Figure 25:
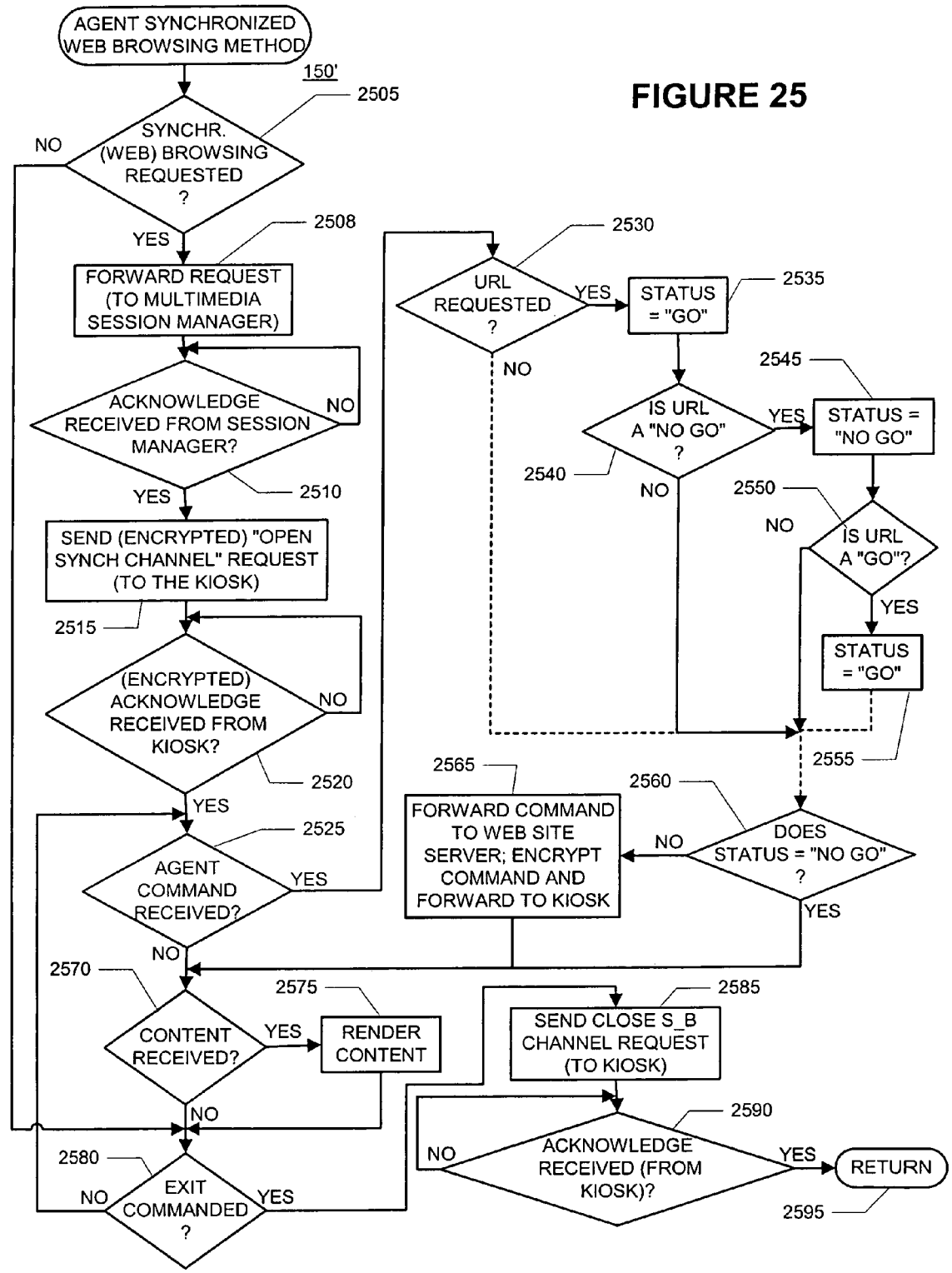
FIG. 25 is a flow diagram of an exemplary method for operating an agent station in a system, such as the system of FIG. 1.

FIG. 25 is a flow diagram of an exemplary method 150' which may be used to effect the synchronized (web) browsing process 140 of the agent station 130. Referring to FIG. 25, at decision branch point 2505, it is determined whether or not a synchronized (web) browsing session is requested (by the agent at the agent station 130). If not, the method 150' branches to decision branch point 2580 (described later). If, on the other hand, it is determined that a synchronized (web) browsing session was requested (e.g., by the live agent), the agent station 130 forwards the request to the multimedia session manager 170 as shown in step 2508, and the method 150' continues to decision branch point 2510. At decision branch point 2510, it is determined whether or not an acknowledge message was received from the multimedia session manager 170. If not, the agent station continues to wait for the acknowledge as indicated by the branching back to decision branch point 2510. Although not shown, a "time-out" feature may be provided so that if an acknowledge is not received within a predetermined amount of time, the method 150' is left or, alternatively, another request is sent. Referring back to FIG. 19, these steps of the method 150' correspond to communications 1905 and 1920.

Assuming that an acknowledge is received from the multimedia session manager 170, the agent station 130 then sends an "open synchronized browsing (or "S_B") channel" request to the kiosk 110, and the method 150' continues to decision branch point 2520. At decision branch point 2520, it is determined whether or not an acknowledge message was received from the kiosk 110. If not, the agent station continues to wait for the acknowledge as indicated by the branching back to decision branch point 2520. Although not shown, a "time-out" feature may be provided so that if an acknowledge is not received within a predetermined amount of time, the method 150' is left or, alternatively, another "open S_B channel" request is sent. Referring back to FIG. 19, these steps of the method 150' correspond to communications 1925 and 1930. Still referring to FIG. 19, the dashed lines denote that these communications are encrypted. For example, recall from communications 1550 and 1560 of FIG. 15 that the multimedia session manager 170 can provide the agent station 130 and the kiosk 110 with the other station's encryption method and public key. Alternatively, the encryption type and public encryption key of the other station could be provided from the multimedia session manager 170 in communications 1910 and 1920 of FIG. 19. In another alternative, the stations can directly exchange encryption type and public key information in (unencrypted) communications 1925 and 1930 of FIG. 19.

Referring once again to FIG. 25, if an acknowledge is received from the kiosk 110, at this point, both the agent station 130 and the kiosk 110 are able to share a synchronized (web) browsing session and the method 150' continues to decision branch point 2525. At decision branch point 2525, it is determined whether or not an agent command is received. If so, steps corresponding to the access control process 156 and the encryption process 154 of the (web) browsing process 140 are effected. More specifically, the method 150' branches to decision branch point 2530 where it is determined whether or not a URL is requested. If not, the method 150' branches to decision branch point 2560 (described later). If, on the other hand, a URL is requested, the access control process 156 of the agent station 130 is effected. For example, the access control status of the agent station 130 can be initialized to GO as shown in step 2535. Then, the method 150' continues to decision branch point where it is determined whether or not the URL is a "NO GO". This determination can be based on lists and/or rules 158. If the URL is not a NO GO, the method 150' branches to decision branch point 2560 (described below). If, on the other hand, the URL is a NO GO, the agent station's access control status is set to NO GO as shown in step 2545 and the method continues to decision branch point 2550. At decision branch point, it is determined whether or not the URL is a GO. This determination can be based on lists and/or rules 158. If not, the method branches to decision branch point 2560. If, on the other hand, the URL is a GO, the agent station's access control status is set to GO as shown in step 2555 and the method 150' continues to decision branch point 2560. At decision branch point 2560, it is determined whether or not the access control status is a NO GO. If the access control status is a NO GO, then the method 150' branches to decision branch point 2570. If, on the other hand, the access control status is not a NO GO, then the command is forwarded to the web site server 190 and encrypted and forwarded to the kiosk 110 as shown in step 2565. The method 150' then continues to decision branch point 2570. Referring back to FIG. 19, these steps are depicted by communications 1935, 1940, 1945, 1950. Note that the dashed lines depicting communications 1935 and 1940 may indicate that the communications are encrypted. The heavy lines depicting communications 1945 and 1950 may indicate unencrypted communications over a network, such as the Internet for example. The commands may include OPEN, CLOSE, GO TO URL, and SCROLL{position}.

The foregoing access control may operate in a similar manner to the access control performed at the kiosk 110 and described in § 4.2.1.2 above. However, the GO, NO lists and/or rules may be different at the kiosk 110 and the agent station 130.

Referring once again to FIG. 25, at decision branch point 2570, it is determined whether or not content is received. If so, the content is rendered as shown in step 2575 and the method 150' continues to decision branch point 2580. Otherwise, the method 150' continues directly to decision branch point 2580. At decision branch point, it is determined whether the agent has commanded an exit from the synchronized web browsing method 150'. If not, the method 150' branches back up to decision branch point 2525. If, on the other hand, an exit command has been received from the agent, the agent station 130 sends a "close synchronized browsing channel" request to the kiosk 130 as shown in step 2585 and the method 150' continues to decision branch point 2590. At decision branch point 2590, it is determined whether or not an acknowledge message is received from the kiosk 110. If so, the method 150' is left via RETURN node 2595. If not, the agent station 130 continues to wait for the acknowledge message as shown by the branching back to decision branch point 2590. Although not shown, a "time-out" feature may be provided so that if an acknowledge is not received within a predetermined amount of time, the method 150' is left via RETURN node 2595 (and an error message may be reported to the multimedia session manager 170). Referring back to FIG. 19, step 2585 and decision branch point 2590 correspond to messages 1965 and 1970. The dashed lines of these messages may indicate that the communications are encrypted.

Having described an exemplary multimedia session manager 170, an exemplary kiosk 110 and an exemplary agent station 130, an exemplary web site server is now discussed in § 4.2.1.4 below.

§ 4.2.1.4 Web Site Server Processes and Architecture

Recall that a web site server 190 may function to serve requested web pages or other content. Thus, many known and commercially available web site servers may be employed in the system 100. The web site server 190 may also function to maintain a history log of, and/or information entered during, a transaction (referred to simply as "transaction information") and perform other proprietary functions.

§ 4.3 Examples of Operation

§ 4.3.1 Establishing an Audio/Video Call

Station to station call (which may include audio, video and/or text communications) setup was described with reference to FIG. 15 in § 4.2.1.1.5.2 above.

§ 4.3.2 Agent Lead (Secure) Synchronized Browsing

An example of an operation of the present invention in a secure, synchronized (web) browsing session is now summarized with reference to FIG. 19. In the following example, it is assumed that the relevant kiosk 110 and agent station 130 have already logged in with the multimedia session manager 170 and that a call has already been established between a customer at the kiosk 110 and the agent at the agent station 130. Recall finally, that in one embodiment of the present invention, the agent at the agent station controls the synchronized (web) browsing process and its initiation. The agent station 130, in response to an agent command, may sent a request for a synchronized web browsing to the multimedia session manager 170 as shown by communication 1905. (Recall step 2508 of FIG. 25.) In response, the multimedia session manager 170 forwards a request message to the kiosk 110 as shown by communication 1910. (Recall steps 1810 and 1820 of FIG. 18.) In response, the kiosk 110 sends an acknowledge message back to the multimedia session manager 170 as shown by communication 1915. (Recall steps 2015 and 2020 of FIG. 20.) In response to this acknowledge, the multimedia session manager 170 may then forward an acknowledge message to the agent station 130 that requested the synchronized web browsing. (Recall steps 1830 and 1840 of FIG. 18.) Thus far, all of the communications may be unencrypted and may be sent over a public or a private network.

The agent station 130 can then send an request to open a synchronized browsing channel message to the kiosk 110 as shown by communication 1925. (Recall steps 2510 and 2515 of FIG. 25.) The kiosk 110 may then respond with an acknowledge message as shown by communication 1930. (Recall steps 2025 and 2030 of FIG. 20.) During the (secure) synchronized browsing session, the agent station 130 may send a number of command messages to the kiosk 110 as shown by communications 1935 and the kiosk 110 may send an acknowledge message back to the agent station 130 as shown by communication 1940. (Recall step 2565 of FIG. 25 and step 2030 of FIG. 20.) The commands may include OPEN, CLOSE, GO TO URL, and SCROLL{position}. If the agent station 130 sends a command to GO TO a URL, the agent station 130 will request that URL as shown in communication 1945, and the kiosk station will request that URL as shown in communication 1955. Recall that these requests may be subject to an access control process which may block requests to certain content or URLs. The web site server 190 provides the requested URL to the agent station 130 and kiosk 110 as shown by communications 1950 and 1960, respectively.

Note that in this exemplary embodiment, the synchronized browsing command and acknowledges may be encrypted and sent over a public network, such as the Internet for example. However, the requests for URLs and the content returned are not encrypted.

4.4 CONCLUSIONS

In view of the foregoing, the present invention may be used to establish a (secure) synchronized (web) browsing session between a customer at a first terminal (such as a kiosk 110 for example) and a live agent at an agent station 130. A session manager may be used to establish this session. The first terminal does not need to download an applet from the agent station. Typically, a call will have already been established between the customer and the live agent. The kiosk and/or the agent may control access to content based on locators to the content (e.g., URLs). The access control may be based on GO, NO GO lists and/or rules.

What is claimed is:

1. A method for establishing and effecting a secure synchronized browsing session between a guide terminal and a follower terminal, the method comprising steps of:
   a) providing address and encryption information corresponding to the follower terminal to the guide terminal;
   b) encrypting, with the guide terminal and based on the encryption information corresponding to the follower terminal, a browsing command to generate an encrypted browsing command;
   c) sending the encrypted browsing command to the follower terminal;
   d) receiving, with the follower terminal, the encrypted browsing command;
   e) decrypting, with the follower terminal, the encrypted browsing command to generate a decrypted browsing command; and
   f) effecting, at the follower terminal, the decrypted browsing command, wherein the follower terminal is configured such that at least one of downloading applets is disabled and execution of applets is disabled.

2. The method of claim 1, wherein the browsing command is a request for content associated with a uniform resource locator.

3. The method of claim 2 further including steps of:
   g) determining, at the follower terminal, whether or not access is permitted to the content; and
   h) if it is determined that access is permitted to the content, then requesting the content and if it is determined that access is not permitted to the content, then not requesting the content.

4. The method of claim 3 wherein the step of determining whether or not access is permitted is based on at least one of a list of GO and NO GO locations and rules for determining whether or not a locator is a GO or a NO GO.

5. The method of claim 1 further comprising a step of:
   g) effecting, at the guide terminal, the browsing command.

6. The method of claim 2 further comprising a step of:
   g) effecting, at the guide terminal, the browsing command.

7. The method of claim 1 wherein the address and encryption information corresponding to the follower terminal are provided to the guide terminal via a session manager.

8. The method of claim 1 further comprising a step of:
   g) providing address and encryption information corresponding to the guide terminal to the follower terminal.

9. The method of claim 8 wherein the encryption information corresponding to the guide terminal includes a public key.

10. The method of claim 1 wherein the encryption information corresponding to the follower terminal includes a public key.

11. In a follower terminal, a method for effecting a synchronized browsing session with a guide terminal, the method comprising steps of:
    a) accepting a synchronized browsing command from the guide terminal;
    b) sending an acknowledge reply to the guide terminal in response to the acceptance of the synchronized browsing command;
    c) determining whether access to content associated with the browsing command is permitted; and
    d) if it is determined that access to the content associated with the browsing command is permitted, then requesting the content associated with the browsing command,
    wherein the step of determining whether access to content associated with the browsing command is permitted includes steps of
      i) determining whether or not the browsing command includes a resource locator that has a NO GO status based on at least one of first rules regarding resource locators and a first list of resource locators,
      ii) if it is determined that the browsing command includes a resource locator that has a NO GO status, then
        A) setting a status to NO GO,
        B) determining whether or not the browsing command includes a resource locator that has a GO status based on at least one of second rules regarding resource locators and a second list of resource locators, and C) if it is determined that the browsing command includes a resource locator that has a GO status, then setting the status to GO, and iii) requesting the content associated with the browsing command if the status is GO.

12. The method of claim 11 wherein the synchronized browsing command accepted from the guide terminal is encrypted, the method further comprising a step of decrypting the encrypted synchronized browsing command.

13. The method of claim 12 wherein the acknowledge reply is encrypted.

14. The method of claim 11 wherein the step of determining whether access to content associated with the browsing command is permitted is based on at least one of a list of GO and NO GO content locators and rules for determining whether or not a content locator is a GO or a NO GO.

15. In a guide terminal, a method for effecting a synchronized browsing session with a follower terminal, the method comprising steps of:

a) accepting a synchronized browsing command from an input device of the guide terminal;

b) encrypting the synchronized browsing command based on encryption information associated with the follower terminal;

b1) determining whether or not access to content associated with the browsing command is permitted, and c) sending the encrypted synchronized browsing command to follower terminal.

16. The method of claim 15 wherein the step of determining whether access to content associated with the browsing command is permitted is based on at least one of a list of GO and NO GO content locators and rules for determining whether or not a content locator is a GO or a NO GO.

17. In a guide terminal, a method for effecting a synchronized browsing session with a follower terminal, the method comprising steps of:

a) accepting a synchronized browsing command from an input device of the guide terminal;

b) encrypting the synchronized browsing command based on encryption information associated with the follower terminal; and c) sending the encrypted synchronized browsing command to follower terminal, wherein the follower terminal is configured such that at least one of downloading applets is disabled and execution of applets is disabled.

* * * * *